(12) United States Patent
Mathey-Owens et al.

(10) Patent No.: US 9,972,134 B2
(45) Date of Patent: May 15, 2018

(54) ADAPTIVE SMOOTHING BASED ON USER FOCUS ON A TARGET OBJECT

(71) Applicant: Microsoft Technology Licensing, LLC, Redmond, WA (US)

(72) Inventors: Cheyne Rory Quin Mathey-Owens, Seattle, WA (US); Andrew Austin Jackson, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days. days.

(21) Appl. No.: 15/198,958

(22) Filed: Jun. 30, 2016

(65) Prior Publication Data
US 2018/0005438 A1    Jan. 4, 2018

(51) Int. Cl.
| | |
|---|---|
| *G06T 19/00* | (2011.01) |
| *G06T 5/00* | (2006.01) |
| *G06T 3/60* | (2006.01) |
| *G06F 3/01* | (2006.01) |
| *G02B 27/01* | (2006.01) |

(52) U.S. Cl.
CPC ........ *G06T 19/006* (2013.01); *G02B 27/0172* (2013.01); *G06F 3/013* (2013.01); *G06T 3/60* (2013.01); *G06T 5/002* (2013.01); *G02B 2027/014* (2013.01)

(58) Field of Classification Search
CPC ..... G06T 11/203; G06T 15/503; G06T 11/40; G06T 2200/12; G06T 11/001
See application file for complete search history.

(56) References Cited

U.S. PATENT DOCUMENTS

| | | |
|---|---|---|
| 5,016,282 A | 5/1991 | Tomono et al. |
| 5,726,916 A | 3/1998 | Smyth |
| 6,407,724 B2 | 6/2002 | Waldern et al. |

(Continued)

FOREIGN PATENT DOCUMENTS

| | | |
|---|---|---|
| CN | 104864870 | 8/2015 |
| WO | WO2009145449 | 12/2009 |

OTHER PUBLICATIONS

Gallant, John, "Adaptive smoothing for noisy DEMs", In Proceedings of Geomorphometry, Jun. 24, 2011, pp. 37-40.

(Continued)

*Primary Examiner* — Todd Buttram
(74) *Attorney, Agent, or Firm* — Jacob P. Rohwer; Newport IP, LLC

(57) ABSTRACT

Techniques described herein dynamically adapt an amount of smoothing that is applied to signals of a device (e.g., positions and/or orientations of an input mechanism, positions and/or orientations of an output mechanism) based on a determined distance between an object and the device, or based on a determined distance between the object and another device (e.g., a head-mounted device). The object can comprise one of a virtual object presented on a display of the head-mounted device or a real-world object within a view of the user. The object can be considered a "target" object based on a determination that a user is focusing on, or targeting, the object. For example, the head-mounted device or other devices can sense data associated with an eye gaze of a user and can determine, based on the sensed data, that the user is looking at the target object.

18 Claims, 10 Drawing Sheets

(56) References Cited

U.S. PATENT DOCUMENTS

| | | | |
|---|---|---|---|
| 8,487,775 | B2 | 7/2013 | Victor et al. |
| 9,237,844 | B2 | 1/2016 | De Bruijn et al. |
| 2003/0009247 | A1 | 1/2003 | Wiser et al. |
| 2003/0136907 | A1 | 7/2003 | Takane et al. |
| 2005/0015221 | A1 | 1/2005 | Tice |
| 2009/0309830 | A1 | 12/2009 | Yamamoto et al. |
| 2010/0182510 | A1 | 7/2010 | Gerkmann et al. |
| 2013/0009980 | A1* | 1/2013 | Gu .................. G06T 5/00 345/611 |
| 2015/0135133 | A1 | 5/2015 | Munoz-Bustamante |
| 2015/0331484 | A1 | 11/2015 | Peterson et al. |
| 2016/0139433 | A1* | 5/2016 | Du ................ G02B 27/017 351/205 |
| 2016/0140763 | A1 | 5/2016 | Seichter et al. |
| 2017/0064157 | A1* | 3/2017 | Lawrence .......... H04N 5/225 |

OTHER PUBLICATIONS

Hatzitaki, et al., "Postural Sway and Gaze Can Track the Complex Motion of a Visual Target", In Journal of PLoS One, vol. 10, Issue 3, Mar. 16, 2015, pp. 1-14.

"International Search Report and Written Opinion Issued in PCT Application No. PCT/US2017/037095", dated Aug. 28, 2017, 12 Pages.

\* cited by examiner

ADAPTIVE SMOOTHING BASED ON USER FOCUS ON A TARGET OBJECT

BACKGROUND

Augmented reality (AR), virtual reality (VR), and/or mixed reality (MR) systems enable a user to interact with virtual objects presented via an interface. The interface can include virtual objects rendered and presented via a display of a head-mounted device such that the virtual objects appear to be objects in the user's real-world environment. To enable the user to interact with the virtual objects presented on the display, these types of systems can include various input mechanisms that send signals to the head-mounted device. For instance, the head-mounted device can process signals received from an input mechanism controlled by the hand of the user, and coordinate an interaction based on the processed signals (e.g., the head-mounted device may be configured to display a virtual pointer in association with a position and/or an orientation of the input mechanism).

As part of the signal processing, the head-mounted device can "smooth" the signals over time using a smoothing algorithm configured to capture important patterns in the signals and/or predict future motion and/or rotation, while eliminating noise. By smoothing the signals, the amount of "jitter" of a virtual element that is being controlled by the motion and/or the rotation of the input signal is reduced. The jitter can be caused by a shaking hand or arm and can be indicative of small changes in position and/or orientation of the input mechanism. Smoothing signals, however, creates latency because signals received over a period of time must be processed (e.g., averaged) to reduce or eliminate the noise. In some instances, this latency can frustrate the user experience associated with augmented reality (AR), virtual reality (VR), and/or mixed reality (MR) systems.

SUMMARY

This disclosure describes techniques for identifying a target object in a scene based on, for example, a sensed direction of eye gaze of a user, a position and/or orientation of an input mechanism, or the like. Then a distance between (i) the target object and (ii) a head-mounted device or an input mechanism can be determined (e.g., calculated) and the distance can be mapped to a value in a smoothing scale. The techniques can then use the value to adjust a parameter of a smoothing algorithm that controls motion and/or rotation of a virtual element presented by a display relative to motion and/or rotation of an input mechanism. The smoothing scale is configured so that an amount of smoothing increases as the distance between the target object and a device (e.g., the head-mounted device or input mechanism) increases, and the amount of smoothing decreases as the distance between the target object and the device decreases. Consequently, the techniques can dynamically adapt an amount of smoothing as a user changes focus from one object to another object (e.g., a user turns his or her head so that he or she is looking at a closer object and is no longer looking at an object further away).

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
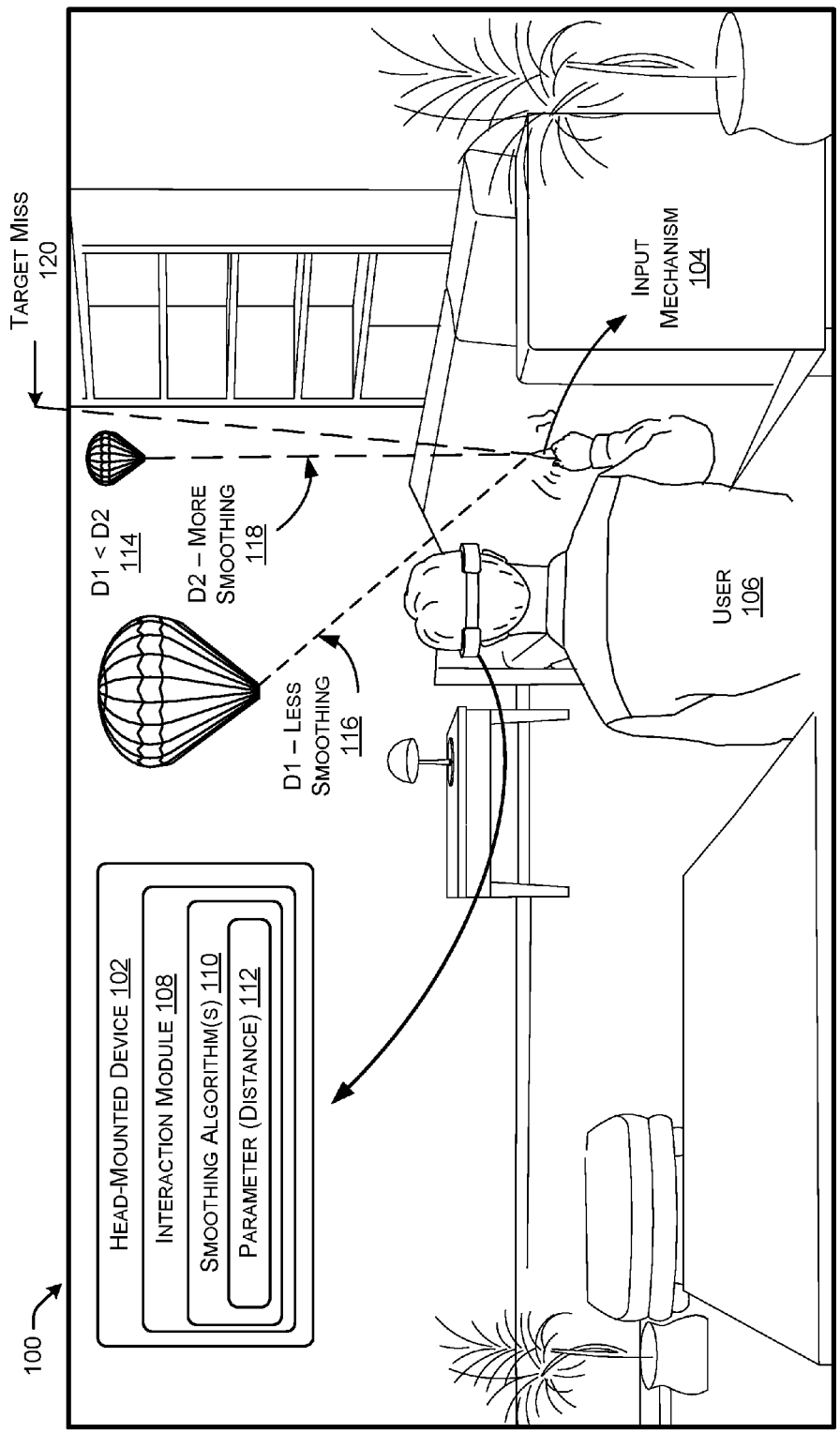
FIG. 1 is a schematic diagram showing an example environment within which an amount of smoothing applied to signals received from an input mechanism can be dynamically determined based on a distance.

This disclosure describes techniques for dynamically adapting an amount of smoothing that is applied to signals of a device (e.g., positions and/or orientations of an input mechanism, positions and/or orientations of an output mechanism) based on a determined distance between an object and the device, or based on a determined distance between the object and another device (e.g., a head-mounted device). The object can comprise a virtual object presented on a display of the head-mounted device, or a real-world object within a view of the user. The object can be considered a "target" object based on a determination that a user is focusing on, or targeting, the object. For example, the head-mounted device or other devices can sense data associated with an eye gaze of a user and can determine, based on the sensed data, that the user is looking at the target object. As another example, the head-mounted device or other devices can sense data associated with a pointing device or gesture of the user and can determine, based on the sensed data, that the user is pointing at the target object. In some instances, the head-mounted device or other devices can identify a target object based on a combination of sensed data indicative of a user's eye gaze being directed to the target object and sensed data indicative of a user pointing at the target object (e.g., via the use of a pointer input mechanism).

Therefore, the techniques described herein are configured to identify a target object in a scene based at least in part on a sensed input (e.g., eye gaze, pointing device or gesture, etc.) of a user. Then a distance between (i) the target object and (ii) a head-mounted device or an input mechanism can be determined (e.g., calculated) and the distance can be mapped to a value in a smoothing scale. The techniques then use the value to adjust a parameter of a smoothing algorithm that controls motion and/or rotation of a virtual element presented by a display relative to motion and/or rotation of an input mechanism. The smoothing scale is configured so that an amount of smoothing increases as the distance between the target object and a device increases, and the amount of smoothing decreases as the distance between the target object and the device decreases. Consequently, the techniques dynamically adapt an amount of smoothing as a user changes focus from one object to another object (e.g., a user turns his or her head so that he or she is looking at a closer object and is no longer looking at an object further away).

As used herein, a "scene" comprises content presented in association with a display of an augmented reality system, virtual reality system, and/or mixed reality system. Therefore, a scene comprises virtual, computer-generated content (e.g., virtual objects) with which a user can interact via a virtual element under control of an input mechanism. In various examples, the scene can also comprise physical, real-world objects that surround the user in an environment and that can move in and/or out of a field of view based on movement of the head-mounted device being worn by a user and/or movement patterns of the physical, real-world objects (e.g., other people, pets, etc.).

The motion and/or the rotation of the input mechanism can be tracked and/or determined by a computing device (e.g., a head-mounted device) from signals (e.g., data points) received from the input mechanism over a period of time. The signals report a position and/or an orientation of the input mechanism at a given time based on data detected by sensors of the input mechanism. Thus, changes in position over time represent motion of the input mechanism, while changes in orientation over time represent rotation of the input mechanism. In various examples described herein, the motion and/or the rotation of an input mechanism controls a virtual element that may be viewable by the user via the display of a head-mounted device. Consequently, the motion and/or the rotation of the input mechanism can control, or at least contribute to, an interaction between the virtual element and a virtual object presented to the user via the display (e.g., a selection of a virtual menu option). As an example, the virtual element controlled by the motion and/or the rotation of the input mechanism can be a cursor that is seen by a user on the display of a head-mounted device. In another example, the virtual element controlled by the motion and/or the rotation of the input mechanism can be a pointer that is seen by a user on the display of a head-mounted device (e.g., the appearance of a laser emitted from a tip of the input mechanism into the scene).

The input mechanism that detects and reports data on position and orientation can be a six degrees of freedom (6DoF) input mechanism (e.g., a 6DoF device). Six degrees of freedom refers to the freedom of movement of an input mechanism in three-dimensional space. That is, the input mechanism, under control of a user's arm and/or hand, for example, can (i) change position forward and backward, (ii) change position up and down, and (iii) change position left and right. Thus, the first, second, and third degrees of a 6DoF device are associated with the three perpendicular axes of the three-dimensional space. Further, the input mechanism, under control of a user's hand and/or arm, for example, can change orientation through rotation with respect to the three perpendicular axes. Thus, the fourth, fifth, and sixth degrees of a 6DoF device are associated with orientation and are often referred to as "pitch", "yaw", and "roll".

By dynamically adapting the amount of smoothing applied to signals from the input mechanism, the techniques improve the user experience and/or conserve resources of the head-mounted device (e.g., processing resources, memory resources, etc.). For example, if the target object in a scene is close to the user (e.g., close to the head-mounted device and/or the input mechanism), the noise caused by the "jitter" or "shakiness" of the hand and/or arm has a minimal effect (if any) on the ability of the user to successfully direct a virtual element so that it interacts with the target object. Accordingly, in this example, the amount of smoothing used to reduce noise is decreased, along with the latency that results from the smoothing (e.g., low latency occurs). However, in another example, if the target object in a scene is far away from the user (e.g., far away from the head-mounted device and/or the input mechanism), the noise caused by the "jitter" or "shakiness" of the hand and/or arm has a greater effect on the ability of the user to successfully direct a virtual element so that it interacts with the target object. Accordingly, in this other example, the amount of smoothing used to reduce noise is increased, along with the latency that results from the smoothing (e.g., high latency occurs).

In some examples, the techniques described herein can be performed in whole or in part using a head-mounted device (e.g., OCULUS RIFT by OCULUS VR, GOOGLE GLASS by GOOGLE INC., HOLOLENS by MICROSOFT CORPORATION, etc.). The head-mounted device may include one or more displays to display virtual content (e.g., a virtual object such as a rendered holographic image), one or more onboard processors and memory, while in other examples, the head-mounted device may be communicatively coupled (wired or wireless) to one or more remote processing and/or memory resources. In other examples, the techniques described herein can be implemented using a game console or other device in communication with a depth camera (e.g., KINECT by MICROSOFT CORPORATION, etc.).

FIG. 1 is a schematic diagram showing an example environment 100 within which an amount of smoothing applied to signals received from an input mechanism can be dynamically determined based on a distance. The signals received from the input mechanism can comprise data points representing a position and/or an orientation of the input mechanism (e.g., changes in position and/or orientation over a period of time). For instance, the input mechanism may report up to 120 data points (e.g., updates) associated with position and/or orientation per second. In accordance with the examples described herein, the distance used to dynamically determine the amount of smoothing can be a calculated distance between a target object and a head-mounted device, or a calculated distance between a target object and an input mechanism. The distance may be calculated in a three-dimensional space associated with field of view of the user.

Therefore, the example environment 100 includes a head-mounted device 102 and an input mechanism 104 associated with a user 106. The head-mounted device 102, details of which are further described herein with respect to FIGS. 2, 4, 8, 9, and/or 10, is configured to be placed (e.g., mounted)

on the head of the user 106. As described above, the input mechanism 104 is configured to detect and report, to the head-mounted device 102, data points indicative of a position and/or an orientation of the input mechanism 104 (e.g., as the position and/or orientation changes over time). The input mechanism 104 is configured to be moved and/or rotated within a first three-dimensional coordinate space recognizable by the head-mounted device 102 or other devices. For instance, the first three-dimensional space may be associated with (e.g., model) an area within reach of the user's 106 arm or hand, in an event the input mechanism 104 is being handled by the user 106. Accordingly, the input mechanism 104 can include sensors to collect the position and/or the orientation data points. In various examples described herein, the input mechanism 104 includes a six degrees of freedom (6DoF) device configured to be controlled by the arm and/or hand of the user 106. However, in other examples, the input mechanism 104 can be the same (e.g., 6DoF device) or another type of input device configured to be controlled by other parts of the user 106, such as a device configured to be strapped to or around an ankle of the user 106 that tracks the position and/or the orientation of a foot and/or a leg of the user 106.

The head-mounted device 102 can also include sensors. The sensors of the head-mounted device 102 can be outward facing sensors configured to detect positioning data associated with locations of physical objects in a real-world environment (e.g., a table, a chair, a wall, etc.) such that the head-mounted device 102 or another network device can build a model of a physical environment in which the user is located (e.g., a room, an office, etc.). Outward facing sensors can also detect physical characteristics of the user 106 (e.g., hand and/or arm position) and use the physical characteristics detected to determine position and/or orientation data of the hand (e.g., the hand can be an input mechanism). Moreover, the sensors can be inward facing sensors configured to detect eye gaze, which can contribute to the identification of a target object to which the user's gaze is directed.

The head-mounted device 102 can include an interaction module 108 that uses one or more smoothing algorithm(s) 110 to smooth signals received from the input mechanism (e.g., the signals representative of changes in position and/or orientation over a period of time). As described above, the motion and/or the rotation of the input mechanism 104 can control a virtual element viewable by the user 106 via a display, and therefore, can also control an interaction between the virtual element and a virtual object presented in a scene being viewed by the user 106 via the display. In some instances, the virtual element may not be viewable on the display (e.g., an invisible laser pointer). The head-mounted device 102 is configured to implement a change in position and/or a change in orientation of the virtual element within the display relative to a change in position and/or a change in orientation of the input mechanism 104. That is, the head-mounted device 102 is configured to convert signals representative of motion and/or rotation of the input mechanism 104 in a first three-dimensional space (e.g., space within reach of the user's 106 arm handling the input mechanism 104) into corresponding motion and/or rotation of the virtual element in a second three-dimensional space (e.g., the scene being viewed by the user via the display). In various implementations, the second three-dimensional space is larger, or appears to be larger, than the first three-dimensional space.

Consequently, the smoothing algorithm 110 is configured to "smooth" the motion and/or rotation of the virtual element in the second three-dimensional space based on the signals received from the input mechanism 104. The smoothing algorithm 110 comprises a parameter 112 that can be adjusted based on a distance between a target object in a user's 106 scene and one of the head-mounted device 102 or the input mechanism 104. For example, FIG. 1 illustrates that the user 106 is controlling the input mechanism 104 so that a virtual pointer (e.g., a laser emitted by the input mechanism 104) is directed to a first target object (e.g., a large virtual balloon). FIG. 1 also illustrates that the user 106 is controlling the input mechanism 104 so that a virtual pointer is directed to a second target object (e.g., a small virtual balloon). The head-mounted device 102 is configured to calculate, using coordinates of the second three-dimensional space corresponding to the view of the user 106, a distance between a target object and a device (e.g., the head-mounted device 102 or the input mechanism 104). Therefore, as referenced by 114, FIG. 1 shows that the distance (D1) between the large virtual balloon and the input mechanism 104 is less than the distance (D2) between the small virtual balloon and the input mechanism 104.

Based on the calculated distances, the parameter 112 of the smoothing algorithm 110 can be adjusted, and comparatively speaking, the interaction module 108 is configured to perform less smoothing when the user 106 focuses on the large virtual balloon that is closer, as referenced by 116. Moreover, the interaction module 108 is configured to perform more smoothing when the user 106 focuses on the small virtual balloon that is further away, as referenced by 118. As described above, less smoothing is used for target objects in a scene that are closer to the user 106 because the noise caused by the "jitter" or "shakiness" of the hand and/or arm has a minimal effect (if any) on the ability of the user to successfully direct a virtual element (e.g., the virtual pointer) so that it interacts with the target object (e.g., the large virtual balloon). Accordingly, latency caused by the lessened amount of smoothing can also be minimized or eliminated. In contrast, more smoothing is used for target objects in a scene that are further away from the user 106 because the noise caused by the "jitter" or "shakiness" of the hand and/or arm has a greater effect on the ability of the user to successfully direct a virtual element (e.g., the virtual pointer) so that it interacts with the target object (e.g., the small virtual balloon). For instance, due to the "jitter" or "shakiness" of the hand, small and rapid changes in position and/or orientation of the virtual element (e.g., the laser pointer) occur making it more likely for the user 106 to struggle to complete the interaction (e.g., miss the target, as referenced by 120 in FIG. 1). That is, the noise introduced by unsmoothed signals are exacerbated as the distance increases. Accordingly, latency caused by the increased amount of smoothing is increased, but the user experience is improved.

The example described above is a comparative example. To determine a specific amount of smoothing to use, the interaction module 108 comprises a smoothing scale, which is further described herein. The interaction module 108 is configured to map a distance to a value in the smoothing scale, and then use the value to adjust the parameter 112 of the smoothing algorithm 110.

In various implementations, a smoothing algorithm 110 can comprise a low-pass filter. For instance, the low-pass filter can determine an average of the last N (e.g., ten, twenty, thirty, etc.) updates (e.g., data points) to determine a position and/or an orientation of the input mechanism 104, and by association, a corresponding position and/or orientation of a virtual element controlled by the input mechanism 104. In at least one example, a smoothing algorithm 110 can comprise an exponential smoothing filter (e.g., a type of low-pass filter) to smooth the signals received from the input mechanism 104 and/or to predict motion and/or rotation of the input mechanism 104 based on the signals received (e.g., based on determined velocity of input mechanism 104). The exponential smoothing filter can be associated with a half-life value, which is a measure of how much weight is applied to historical data points versus new data points. That is, a half-life value of "0" means that historical values have no factor in a smoothed value, and thus the lowest possible latency occurs, whereas a half-life value of "0.1" gives historical values more weight, resulting in a relatively high amount of smoothing as well as higher latency. The smoothing scale can be used to dynamically determine a half-life value based on a calculated distance between a target object and a device (e.g., the head-mounted device 102, the input mechanism 104) associated with a user 106.

It is contemplated that other smoothing algorithms 110 can also be used. For instance, a smoothing algorithm can comprise Laplacian smoothing, local regression, a moving average, a Ramer-Douglas-Peucker algorithm, a Savitzky-Golay smoothing filter based on the least-squares fitting of polynomials to segments of the data, and so forth.

Figure 2:
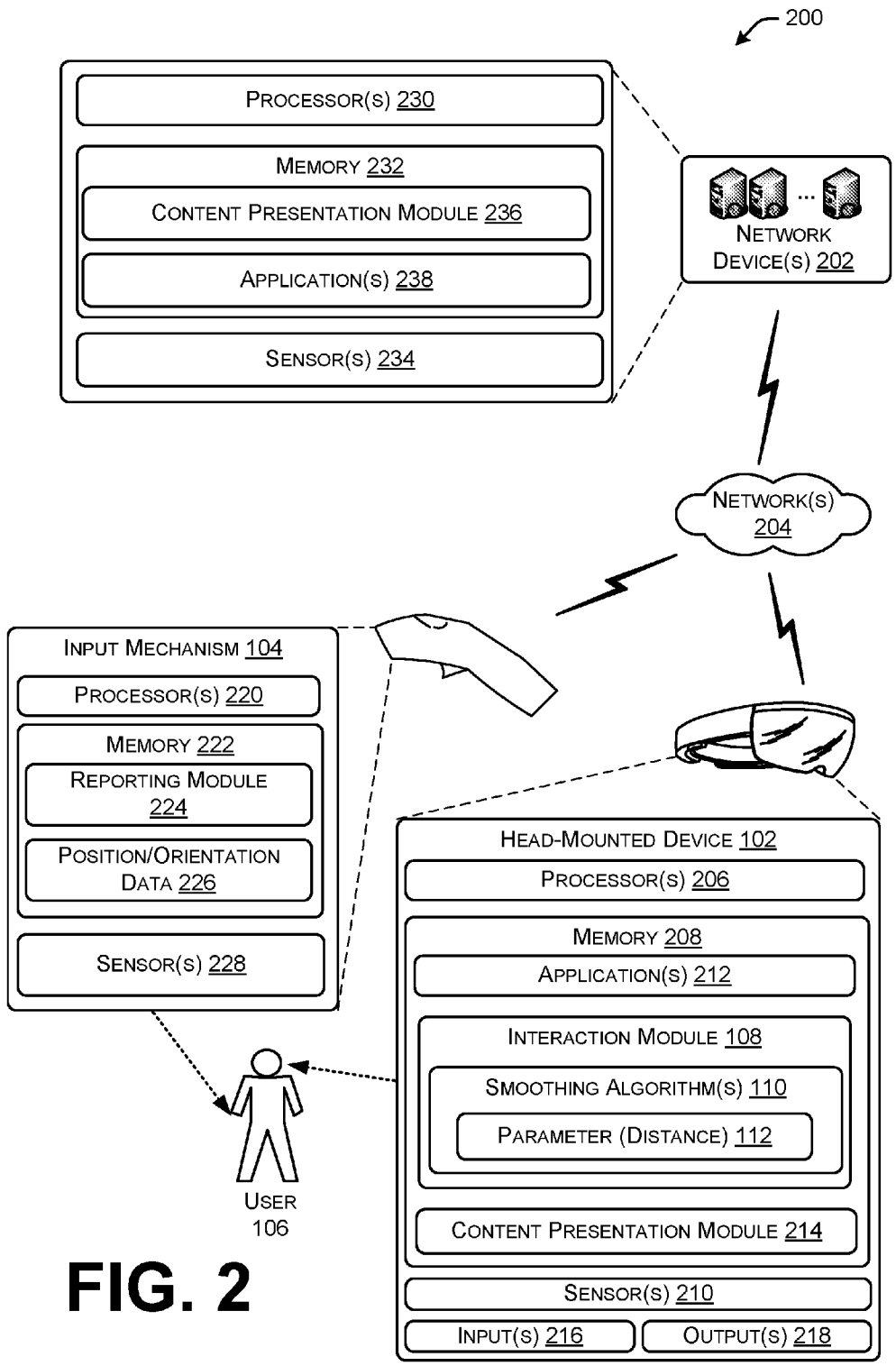
FIG. 2 is a schematic diagram showing an example computing and networking environment within which an amount of smoothing applied to signals received from an input mechanism can be dynamically determined based on a distance.

FIG. 2 is a schematic diagram showing an example computing and networking environment 200 within which an amount of smoothing applied to signals received from an input mechanism can be dynamically determined based on a distance. The environment 200 includes the head-mounted device 102, the input mechanism 104, and network device(s) 202, each configured to communicate over network(s) 204. While the examples provided herein are described with respect to a head-mounted device 102, it is understood in the context of this document that the techniques can be implemented by other computing devices as well, including but not limited to a laptop computer, a tablet computer, another type of wearable device, a gaming device, and so forth. Moreover, the display can be part of the computing device or a peripheral display coupled to the computing device.

In various implementations, the network(s) 204 can be any type of wired and/or wireless networks known in the art. Moreover, the devices (e.g., the head-mounted device 102, the input mechanism 104, the network device(s) 202) can communicatively couple to the network(s) 204 in any manner, such as by a wired or wireless connection (e.g., Wi-Fi, Bluetooth, cellular data connection, Ethernet, etc.).

The head-mounted device 102 can include one or more processing unit(s) (e.g., processor(s) 206), computer-readable media such as memory 208, and one or more sensors 210 (e.g., image sensors, depth sensors, gaze tracking sensors, etc.). Processor(s) 206 can represent, for example, a CPU-type processing unit, a GPU-type processing unit, a HPU-type processing unit, a field-programmable gate array (FPGA), another class of digital signal processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-On-a-Chip systems (SOC s), Complex Programmable Logic Devices (CPLDs), etc. In various examples, the processor(s) 206 can execute one or more instructions, modules, and/or processes to cause the head-mounted device 102 to perform a variety of functions, such as those described herein. Additionally, each of the processor(s) 206 can possess its own local memory, which also can store program modules, program data, and/or one or more operating systems.

The memory 208 may include one or more applications 212, such as an operating system, a browser, a gaming application, or the like. The operating system can be configured to manage hardware and services within and coupled to the head-mounted device 102 for the benefit of other components and/or modules. The memory 208 also includes the interaction module 108 and a content presentation module 214, each of which are further described herein. In various examples, a module can represent pieces of code executing on a computing device (e.g., the head-mounted device 102). In some examples, individual modules can include an interface, such as an Application Program Interface (API), to perform some or all of its functionality (e.g., operations). In additional and/or alternative examples, a module can be implemented as computer-readable instructions, data structures, and so forth that are executable by at least one processing unit (e.g., processor(s) 206) to configure the device to perform the operations described herein. Functionality to perform these operations can be implemented by a single device (e.g., the head-mounted device 102) or distributed across multiple devices (e.g., the head-mounted device 102 and a network device 202).

The sensor(s) 210 can be any device or combination of devices configured to sense conditions of a user or surroundings of the user. For instance, the sensor(s) 210 can include one or more outwardly facing cameras or other sensors for capturing images of real-world objects and surroundings of the user (e.g., physical objects in the user's 106 environment). The sensor(s) 210 can additionally and/or alternatively include a depth map sensor, a light field sensor, a gyroscope, a sonar sensor, an infrared sensor, a compass, an accelerometer, a global positioning system (GPS) sensor, and/or any other device or component for detecting a position and/or orientation of the head-mounted device 102 and/or other physical objects located around the head-mounted device 102.

The head-mounted device 102 can also include input(s) 216 (e.g., input interface(s)) and output(s) 218 (e.g., output interface(s)). At least one input 216 can be configured to receive data and/or instructions from the input mechanism 104 (e.g., a 6DoF device). Additionally, and by way of example and not limitation, the input(s) 216 can include a keyboard, a keypad, a mouse, a microphone, a touch sensor, a touch screen, a joystick, physical and/or soft control buttons, a scrolling button, a camera, a neural interface, or any other device or component suitable to generate a signal and/or data defining a user interaction with the head-mounted device 102. By way of example and not limitation, the output(s) 218 can include a display (e.g., a holographic display, a head-up display, a projector, a touch screen, a liquid crystal display (LCD), etc.), speakers, haptic interfaces, or the like.

In at least one example, an output 218 can be a hardware display surface that can be configured to allow for a real-world view of a real-world object through the hardware display surface while also providing a rendered display of computer generated content. The hardware display surface can include one or more components, such as a projector, screen, or other suitable components for producing a display of an object and/or data. In some configurations, the hardware display surface can be configured to cover at least one eye of a user 106. In other configurations, the hardware display surface can include a screen configured to cover both eyes of a user 106. The hardware display surface can render or cause the display of computer generated virtual objects (e.g., an image). For illustrative purposes, an object can be an item, data, device, person, place, or any type of entity. In at least one example, an object can be associated with a function or a feature associated with a system or an application (e.g., popping balloons with a laser as illustrated in FIG. 1).

Some configurations described herein provide both a "see through display" and an "augmented reality display." For illustrative purposes, the "see through display" can include a transparent lens that can have content displayed on it. The "augmented reality display" can include an opaque display that is configured to display content over a rendering of an image, which can be from any source, such as a video feed from a camera used to capture images of an environment. In addition, some examples described herein describe techniques that display rendered content over a "see through display" enabling a user to see a real-world view of an object with the content. It can be appreciated that the examples of the techniques described herein can apply to a "see through display," an "augmented reality display," or variations and combinations thereof.

In various implementations, the input mechanism 104 can also comprise one or more processor(s) 220 and memory 222, example of which are provided above with respect to processor(s) 206 and memory 208. Further examples of processors and computer-readable media (e.g., memory) are described below with respect to any one of FIGS. 8, 9, and/or 10. The memory 222 includes a reporting module 224 configured to send, to the head-mounted device 102 over a period of time, position and/or orientation data 226 of the input mechanism 104 (e.g., may also be referred to herein as "signals", "data points", and/or "updates"). The position and/or orientation data 226 of the input mechanism 104 can be detected by sensor(s) 228. The position and/or orientation data 228 can be stored locally at the input mechanism 104 and/or can be provided (e.g., reported) to the head-mounted device 102 via the network(s) 204 (e.g., in real-time or close to real-time). To this end, sensor(s) 228 enable the collection and/or generation of data defining a position and an orientation of the input mechanism 104. For instance, sensor(s) 228 can include a gyroscope, an accelerometer, a depth map sensor, a light field sensor, an inertia sensor, a sonar sensor, an infrared sensor, a compass, a global positioning system (GPS) sensor, and/or any other sensor or component for detecting a position and/or an orientation of the input mechanism 104.

As described above, the interaction module 108 is configured to calculate a distance, using coordinates in a three-dimensional space (e.g., a field of view of the user), between a location of a target object (e.g., a computer generated location of a virtual object) and a sensed location of a device associated with the user (e.g., a head-mounted device 102, an input mechanism 104). In some instances, the interaction module 108 calculates the distance between the target object and a sensed location of the user 106. In some examples, the interaction module 108 identifies the target object that has the focus of the user based on eye gaze data indicative of a direction of a user gaze. Additionally or alternatively, the interaction module 108 can identify the target object that has the focus of the user based on the signals representing the position and/or orientation of the input mechanism 104 (e.g., the interaction module 108 can determine that the user is attempting to point the laser at a particular virtual balloon). The interaction module 108 then maps the distance to a smoothing value in a smoothing scale and uses the smoothing value to adjust the parameter 112 of the smoothing algorithm 110 used to smooth the signals received from the input mechanism 104.

The content presentation module 214 is configured to render and present virtual content on the display, in accordance with functions/services of the applications 212. For example, the content presentation module 214 can present the virtual balloons of FIG. 1 in accordance with an application 212.

In various examples, the network device(s) 202 may be part of a service provider, and can be arranged in a data center or a server farm. Additionally or alternatively, the network device(s) 202 can be implemented in a distributed computing environment, with portions of a service running on the network devices 202 (e.g., a game console) which are in communication with the head-mounted device 102. The network device(s) 202 can also include processor(s) 230, memory 232, and/or sensor(s) 234, examples of which are provided above with respect to processor(s) 206, memory 208, and sensors 210. The memory 232 can include a content presentation module 236 and application(s) 238. The content presentation module 236 is configured to render and present computer generated content (e.g., a virtual object) on the display of the head-mounted device 102, in accordance with applications 238 (e.g., a service being performed). For example, the service may comprise a shopping service, a gaming service, a mail service, a social networking service, or the like.

In various examples, the content presentation module 236 on the network device 202 can also include, or at least interact with, an interaction module (e.g., similar to the interaction module 108) to perform aspects of the techniques described above. An application may correspond to an application stored in whole on the head-mounted device 102 or stored in part on the head-mounted device 102 and a network device 202. By way of example and not limitation, an application can include a gaming application, a file sharing application, a browser application, a search application, a productivity application (e.g., a word processing application, a spreadsheet application, a computer-aided design application, etc.), a communication application (e.g., email, instant messaging, audio and/or video conferencing, a social networking application, etc.).

Figure 3:
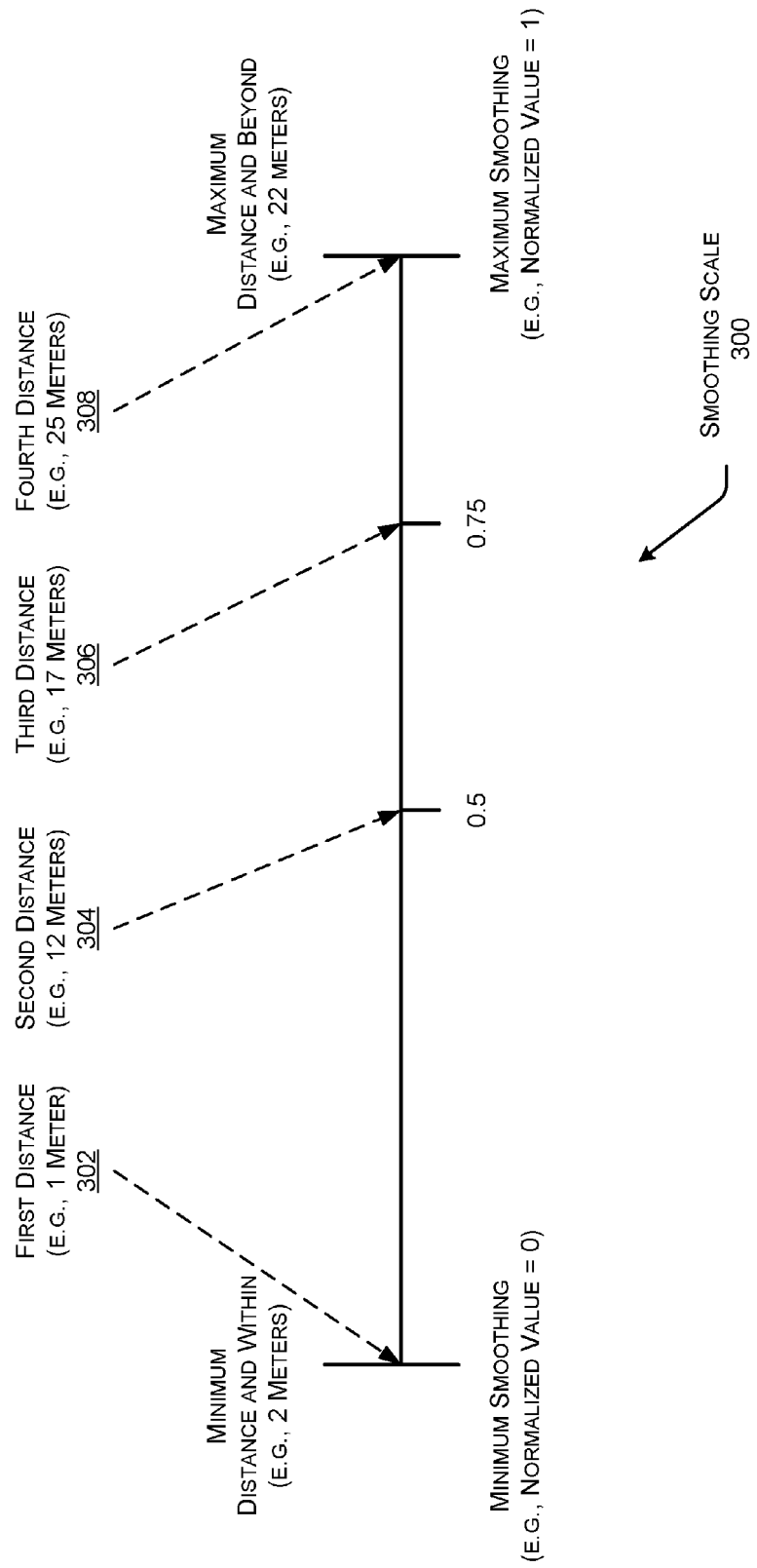
FIG. 3 is a diagram showing an example smoothing scale usable to implement the techniques described herein.

FIG. 3 is a diagram showing an example smoothing scale 300 usable to implement the techniques described herein. The smoothing scale 300 is configured to associate a distance with an amount of smoothing. Accordingly, the smoothing scale 300 can be normalized, such that a minimum distance and any distance less than the minimum distance is associated with a minimum amount of smoothing (e.g., no smoothing) associated with a normalized smoothing value of "0", while a maximum distance and any distance more than the maximum distance is associated with a maximum amount of smoothing associated with a normalized smoothing value of "1". As an example, the minimum distance may be "2" meters such that an interaction with an object that appears to be within 2 meters of the user 106 (e.g., the head-mounted device 102 or the input mechanism 104) is associated with a minimum amount of smoothing. On the other side, the maximum distance may be "22" meters such that an interaction with an object that appears to be "22" meters or more away from the user 106 (e.g., the head-mounted device 102 or the input mechanism 104) is associated with a maximum amount of smoothing.

Using this example, the interaction module 108 maps a first distance of "1" meter to the normalized value of "0" on the smoothing scale 300, as referenced by 302. The interaction module 108 maps a second distance of "12" meters to the normalized value of "0.5" on the smoothing scale 300, as referenced by 304. The interaction module 108 maps a third distance of "17" meters to the normalized value of "0.75" on the smoothing scale 300, as referenced by 306. And lastly, the interaction module 108 maps a fourth distance of "25" meters to the normalized value of "1" on the smoothing scale 300, as referenced by 308. Consequently, as the user focus switches between objects associated with various distances, the amount of smoothing used can be dynamically determined via the mappings 302, 304, 306, 308 shown in the example of FIG. 3.

While the example smoothing scale 300 of FIG. 3 provides linear scaling, it is understood that other types of scaling can also be used (e.g., exponential scaling, non-linear scaling, continuous scaling, stepwise scaling, etc.). Moreover, smoothing can be implemented for motion and rotation independently (e.g., different smoothing algorithms, different smoothing scales, etc.), or smoothing can be implemented for motion and rotation together.

In another example, the interaction module 108 can determine a closest point (e.g., a 3-D coordinate) between a ray describing the user's eye gaze and a ray describing the input mechanism's 104 position and/or orientation (e.g., an emitted laser beam) and then calculate the distance between the point and a position of the input mechanism 104 (e.g., or the head-mounted device 102). The distance can be used in the following scaling equation (which assumes that minDistance=0) to determine a half-life value as:

HalfLife=minHalfLife+((maxHalfLife−minHalfLife)*
clamp(0,distance/maxDistance,1))

In at least one example, minHalfLife=0, maxHalfLife=0.1, and maxDistance=the farthest distance a virtual object can be away from a user (e.g., a distance between the head-mounted device 102 and the wall of a room). If the minimum Distance (minDistance) does not equal zero, the distance can be used in the following scaling equation to determine a half-life value:

HalfLife=minHalfLife+((maxHalfLife−minHalfLife)*
clamp(0,(distance−minDistance)/(maxDistance−minDistance),1))

Figure 4:
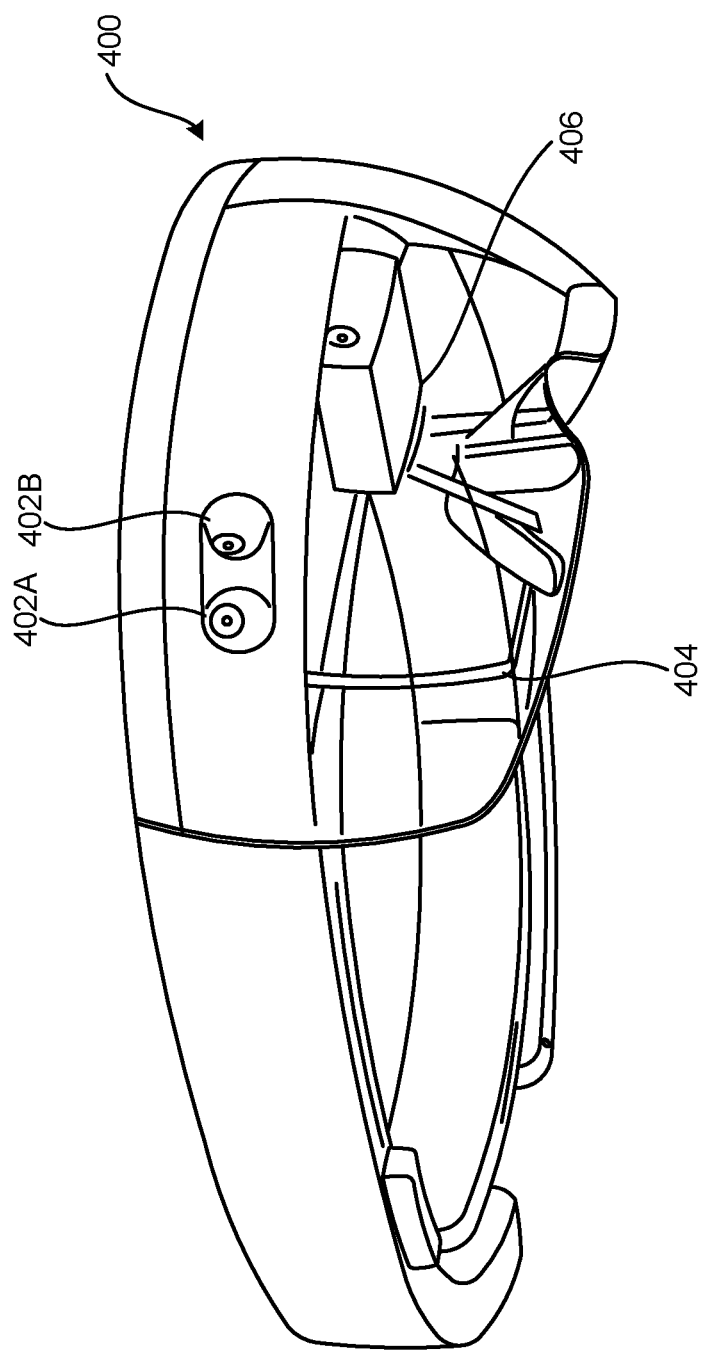
FIG. 4 is a schematic diagram showing an example configuration for a head-mounted device that can be used to implement aspects of the techniques described herein.

FIG. 4 is a schematic of diagram showing an example configuration for a head-mounted device 400 that can be used to implement aspects of the techniques described herein. In various examples, the head-mounted device 400 can correspond to the head-mounted device 102. As described above, the various techniques disclosed herein can be implemented by or in conjunction with such a head-mounted device 400 in order to modify signal processing operations (e.g., smoothing) of the head-mounted device 400 based upon a distance between a computing device (e.g., the head-mounted device 400 or the input mechanism 104) and a target object. In order to provide this functionality, and other types of functionality, the head-mounted device 400 can include one or more sensors 402A and 402B and a display 404. The sensors 402A and 402B can include tracking sensors including, but not limited to, depth cameras and/or sensors, inertial sensors, and optical sensors.

In some examples, the sensors 402A and 402B are mounted on the head-mounted device 400 in order to capture information from a first person perspective (e.g., from the perspective of the wearer of the head-mounted device 400). In additional or alternative examples, the sensors 402A and 402B can be external to the head-mounted device 400. In such examples, the sensors 402A and 402B can be arranged within a scene (e.g., placed in various positions throughout a room such as in association with network devices 202) and associated with the head-mounted device 400 in order to capture information from a third person perspective.

As discussed above, the head-mounted device 400 can also include one or more gaze sensors 406. The gaze sensors 406 can be mounted in front of or behind the display 404 in order to measure the location and direction of the user's gaze. As mentioned above, the gaze sensors 406 can determine the location and direction of the user's gaze in order to determine whether the user's eyes are focused on a particular target object (e.g., a virtual UI menu object presented on the display 404, a holographic object presented on the display 404, or a real-world object, etc.). Although the gaze sensors 406 are shown as being integrated with the device 400, the gaze sensors 406 can be located external to the device 400 in other configurations.

The display 404 can present visual content to the wearer (e.g., the user 106) of the head-mounted device 400. In some examples, the display 404 can present visual content to augment the wearer's view of their actual surroundings in a spatial region that occupies an area that is substantially coextensive with the wearer's actual field of vision. In other examples, the display 404 can present content to augment the wearer's surroundings in a spatial region that occupies a lesser portion the wearer's actual field of vision. The display 404 can include a transparent display that enables the wearer to view both the visual content and the actual surroundings of the wearer simultaneously.

Transparent displays can include optical see-through displays where the user sees their actual surroundings directly, video see-through displays where the user observes their surroundings in a video image acquired from a mounted camera, and other types of transparent displays. The display 404 can present the visual content (which might be referred to herein as a "hologram") to a user such that the visual content augments the user's view of their actual surroundings within the spatial region.

The visual content provided by the head-mounted device 400 can appear differently based on a user's perspective and/or the location of the head-mounted device 400. For instance, the size of the presented visual content can be different based on the proximity of the user to the content. The sensors 402A and 402B can be utilized to determine the proximity (e.g., calculate a distance) of the user to target objects in the scene (e.g., virtual objects presented in the scene, real-world objects, etc.).

Additionally or alternatively, the shape of the content presented by the head-mounted device 400 on the display 404 can be different based on the vantage point of the wearer and/or the head-mounted device 400. For instance, visual content presented on the display 404 can have one shape when the wearer of the head-mounted device 400 is looking at the content straight on, but might have a different shape when the wearer is looking at the content from the side.

Figure 5:
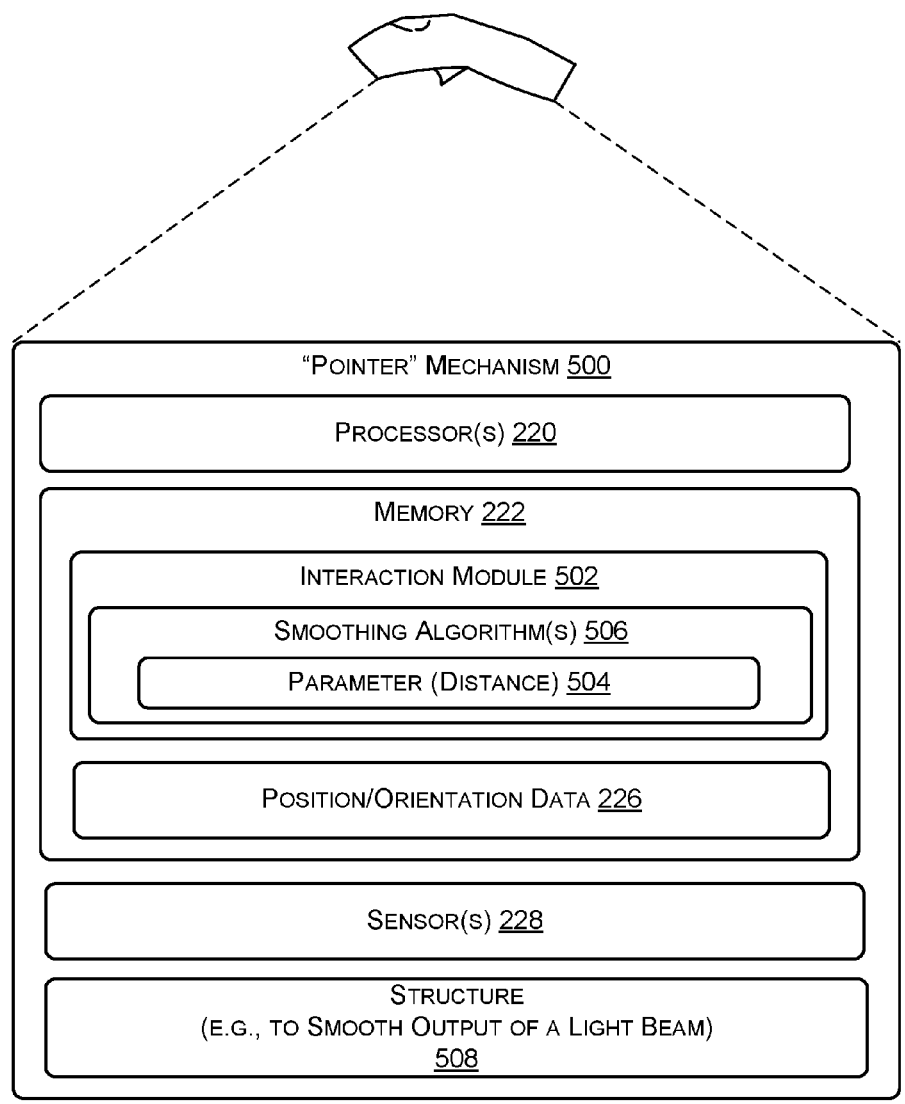
FIG. 5 is a schematic diagram showing another example computing environment within which an amount of smoothing applied to signals associated with a position and/or an orientation of an input mechanism can be dynamically determined based on a distance.

FIG. 5 is a schematic diagram showing another example computing environment within which an amount of smoothing applied to signals associated with a position and/or an orientation of an input mechanism can be dynamically determined based on a distance. In FIG. 5, the input mechanism comprises a "pointer" mechanism 500 (e.g., a laser pointer), which is configured to emit a beam of light (e.g., a laser beam) based on a position and/or an orientation of the pointer mechanism 500. The pointer mechanism 500 includes the processor(s) 220, the memory 222, and the sensor(s) 228, as described above with respect to FIG. 2. However, instead of reporting the detected position and/or orientation data 226 to a head-mounted device 102, the pointer mechanism 500 includes its own interaction module 502, which can be configured to determine a distance between a target object and the pointer mechanism 500 so that a parameter 504 of a smoothing algorithm 506 can be adjusted based on the determined distance.

For example, the distance can be determined via laser range finder techniques that operate by sending a laser pulse towards an object (e.g., a physical object) in the distance and measuring the time taken by the laser pulse to be reflected off the object and returned to the sender (e.g., the device 500). In some instances, the distance can be determined by other devices (e.g., network devices 202) and communicated to the pointer t mechanism 500.

The pointer mechanism 500 is further configured with structure 508 that enables motion and/or rotation of a corresponding output (e.g., a light beam) relative to the motion and/or the rotation of the pointer mechanism 500. That is, the structure 508 can be configured to smooth the corresponding output of the light beam in accordance with the smoothing algorithm. In at least one example, the structure 508 comprises one or more gimbals, wherein an individual gimbal can allow movement and/or rotation of a beam forming object about a single axis. Consequently, in accordance with the techniques described herein, the interaction module 502 controls the structure 508 (e.g., tightens or loosens an amount of control the gimbals have on a beam forming object) so that increased smoothing of the light beam occurs if the target object is further away and so that decreased smoothing of the light beam occurs if the target object is closer.

Figure 6:
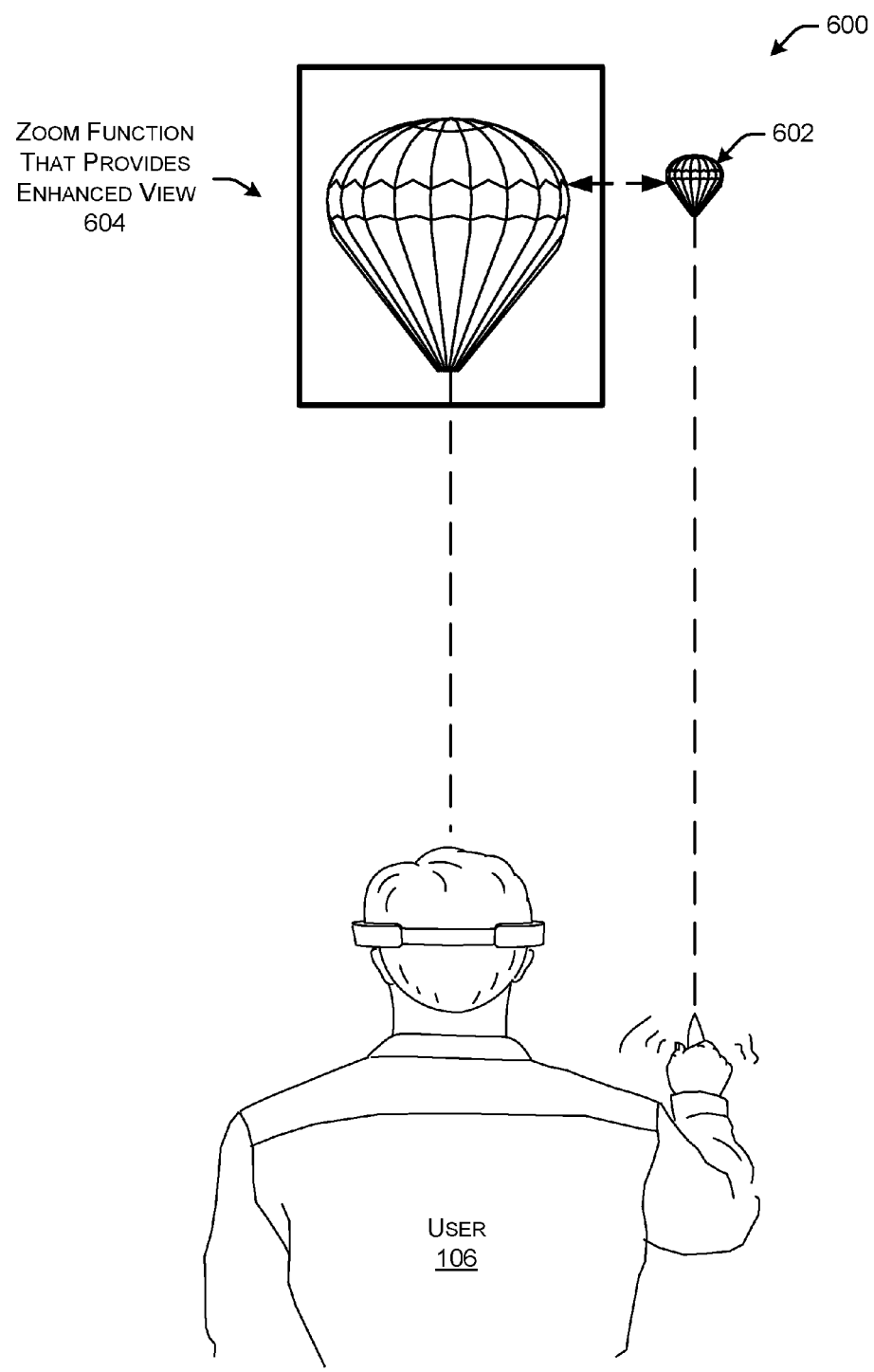
FIG. 6 is a schematic diagram showing another example environment within which aspects of the techniques described herein can be implemented.

FIG. 6 is a schematic diagram showing another example environment 600 within which aspects of the techniques described herein can be implemented. In the example environment 600, the user 106 is playing a balloon popping game where the balloon initially is presented by a display in a particular location 602 that is far away from the user 106. However, via enabling a zoom function, the user 106 may be provided with an enhanced view 604 of the same balloon so the user 106 can better control his/her aim. In this example, the smoothing of the virtual element (e.g., a virtual laser) is implemented based on a distance between the user 106 (e.g., the head-mounted device 102 or the input mechanism 104) and the particular location 602 of the balloon, even though the user can see the enhanced view 604 of the balloon. Similar functionality can be used, for example, in a hunting game where the user is attempting to use an input mechanism 104 to aim at game animals in the distance using a scope (e.g., the zoom function).

Figure 7:
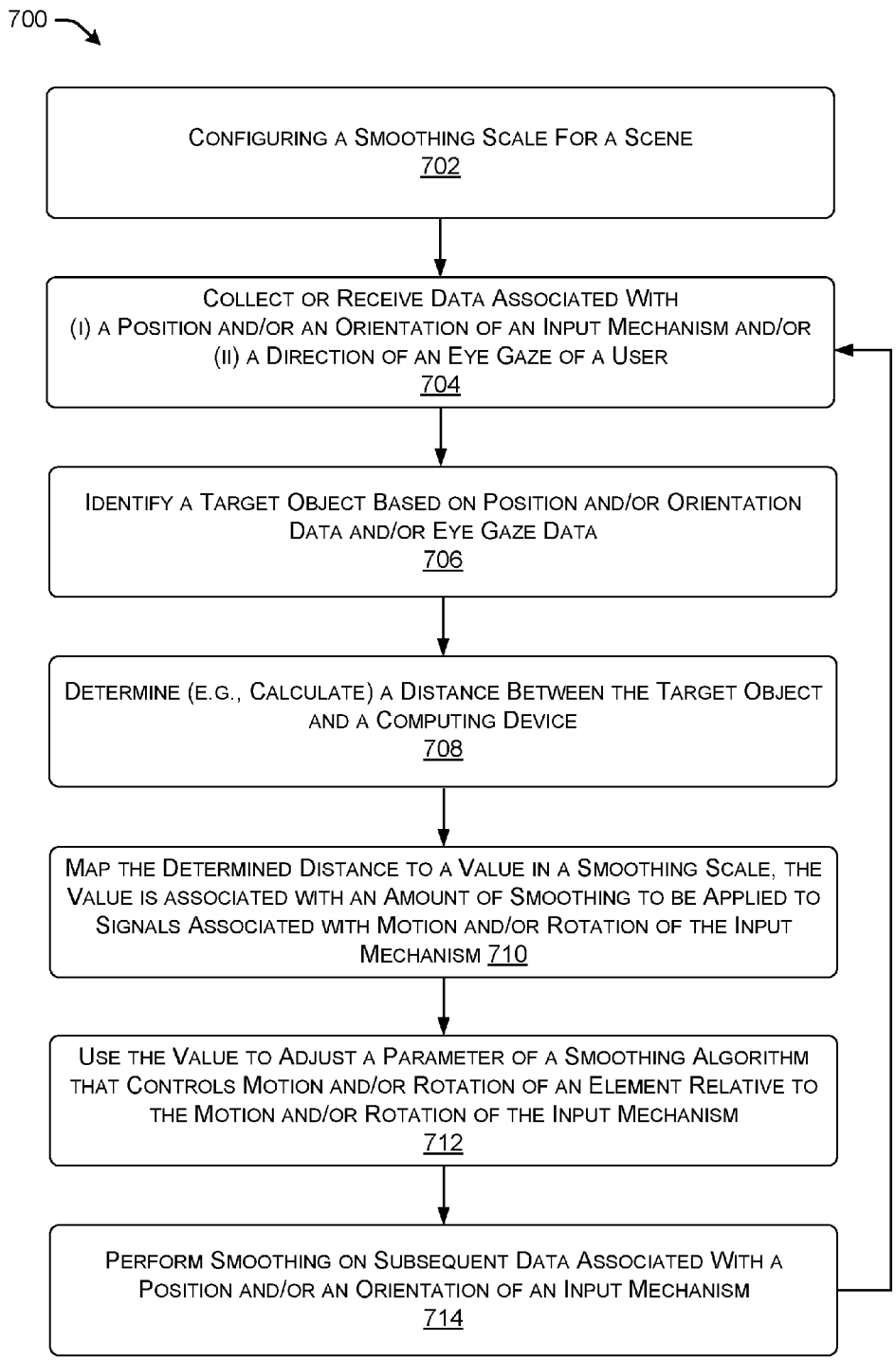
FIG. 7 shows operations of an example process for dynamically determining an amount of smoothing applied to signals based on a distance between a target object and a computing device.

The process described in FIG. 7 is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 7 shows operations of an example process 700 for dynamically determining an amount of smoothing applied to signals based on a distance between a target object and a computing device. The example process 700 may be implemented by the head-mounted device 102, a network device 202, and/or an input mechanism (e.g., the pointer input mechanism 500) as described above with respect to any one of FIG. 1, 2, 4, or 5. However, the example process 700 may be implemented by other devices and in other environments as well.

At 702, a smoothing scale is configured (e.g., in accordance with a smoothing algorithm). For example, a minimum distance (e.g., "2" meters as described with respect to FIG. 3), a minimum amount of smoothing (e.g., no smoothing), a maximum distance (e.g., "22" meters as described with respect to FIG. 3), and a maximum amount of smoothing (e.g., an average of the last N updates) can be determined, as well as a scaling function (e.g., scaling the linearly maps a distance to a value in the smoothing scale, scaling the exponentially maps a distance to a value in the smoothing scale, etc.).

At 704, data associated with a target object is collected and/or received. In a first example, the data can comprise position and/or orientation data of an input mechanism 104 (e.g., indicative of a direction in which the input mechanism 104 is pointing). In another example, the data can be related to a direction of an eye gaze of the user.

At 706, a target object is identified based on the position and/or orientation data of an input mechanism 104 and/or the eye gaze data of the user.

At 708, a distance between the target object and a device associated with the user is determined (e.g., calculated). In one implementation, the device comprises the head-mounted device 102. In another implementation, the device comprises the input mechanism 104. A three-dimensional coordinate space associated with the field of view of the user can be used to determine the distance. That is, the head-mounted device 102 or other devices (e.g., a network device 202) can determine the coordinate location of the target object (e.g., a virtual object presented on the display in the 3-D space or a real-world object located in the user's environment) and the coordinate location of the device, and determine the distance between the two.

At 710, the determined distance is mapped to a value in a smoothing scale, where the value is associated with an amount of smoothing to be applied to signals associated with the motion and/or rotation of the input mechanism. As described above, the amount of smoothing affects an output, or the motion and/or rotation of a virtual element controlled by the motion and/or rotation of the input mechanism.

At 712, the value is used to adjust a parameter of a smoothing algorithm that controls the motion and/or rotation of the virtual element relative to the motion and/or rotation of the input mechanism.

At 714, smoothing is performed on subsequent data associated with the position and/or orientation of the input mechanism.

As shown by the arrow from operation 714 to operation 704, some of the operations can be repeated such that the smoothing is continually adapted based on changes in user focus (e.g., as the user switched focus from an object far away to an object closer, and vice versa).

Figure 8:
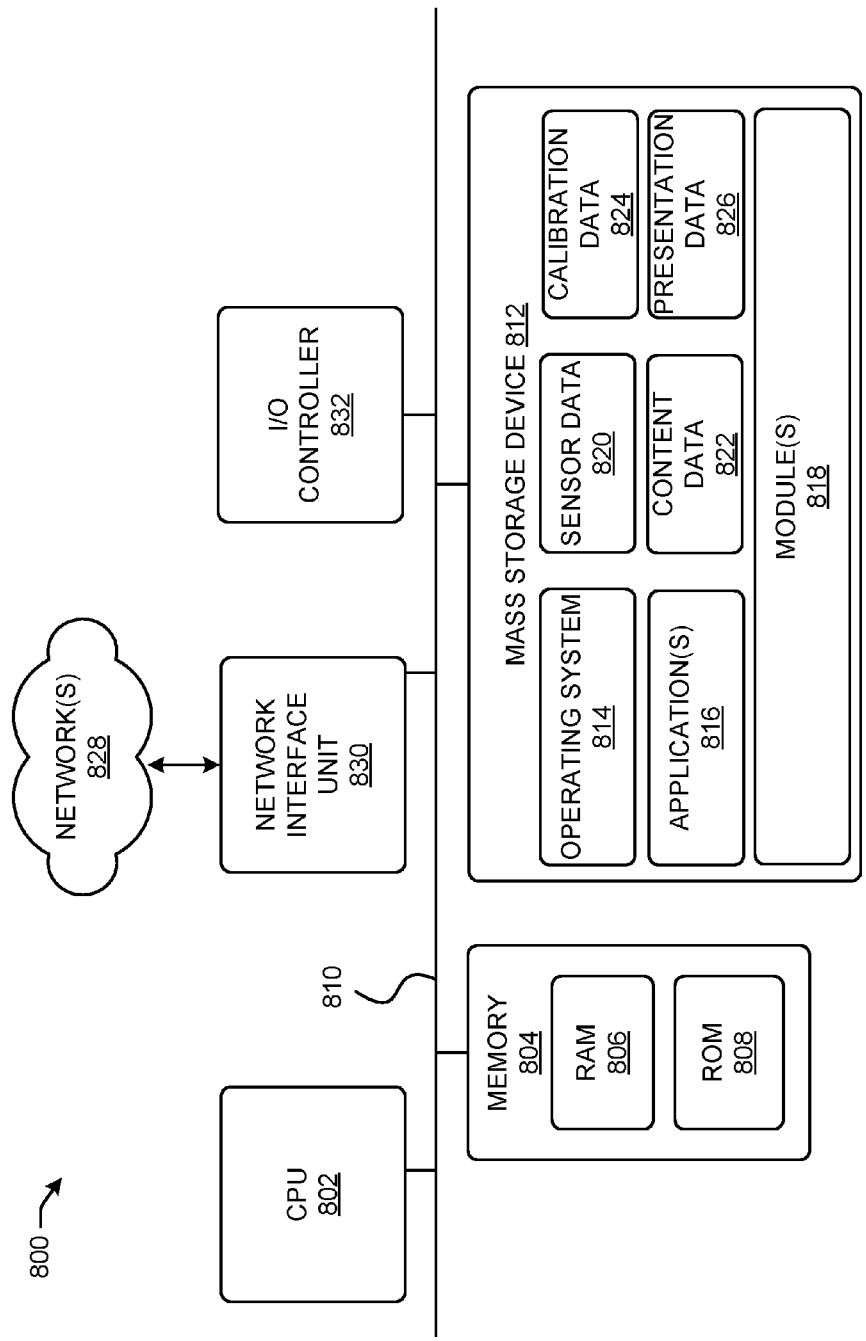
FIG. 8 shows details of an example computing device architecture for a computing device, such as a head-mounted device, capable of executing aspects of the techniques described herein.

FIG. 8 shows details of an example computer architecture 800 for a computing device, such as head-mounted device 102 or networking device 202, capable of executing aspects of the techniques described above. Thus, the computer architecture 800 illustrated in FIG. 8 illustrates an architecture for a server computer, a mobile phone, a PDA, a smart phone, a desktop computer, a netbook computer, a tablet computer, a laptop computer, a wearable computer, a game console, or other computing device. The computer architecture 800 is an example architecture that can be used to execute, in whole or in part, aspects of the software components presented herein.

The computer architecture 800 illustrated in FIG. 8 includes a central processing unit 802 ("CPU"), a system memory 804, including a random access memory 806 ("RAM") and a read-only memory ("ROM") 808, and a system bus 810 that couples the memory 804 to the CPU 802. A basic input/output system ("BIOS") containing the basic routines that help to transfer information between elements within the computer architecture 1300, such as during startup, is stored in the ROM 808. The computer architecture 800 further includes a mass storage device 812 for storing an operating system 814, application(s) 816 (e.g., application(s) 210 and/or 242, etc.), module(s) 818 (e.g., any of the modules illustrated in FIG. 2), and the like. Additionally and/or alternatively, the mass storage device 812 can store sensor data 820 (e.g., from sensors 210, 228, 234, etc.), content data 822 (e.g., photographs, computer generated images, object information about real and/or virtual objects in a scene, metadata about any of the foregoing, etc.), calibration data 824, presentation data 826 (e.g., instructions, prompts, etc.), and the like, as described herein.

The mass storage device 812 is connected to the CPU 802 through a mass storage controller connected to the bus 810. The mass storage device 812 and its associated computer-readable media provide non-volatile storage for the computer architecture 800. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of communication media.

By way of example, and not limitation, computer storage media can include volatile and non-volatile, removable and non-removable media implemented in any method or technology for storage of information such as computer-readable instructions, data structures, program modules or other data. For example, computer storage media includes, but is not limited to, RAM, ROM, erasable programmable read-only memory ("EPROM"), electrically erasable programmable read-only memory ("EEPROM"), flash memory or other solid state memory technology, compact disc read-only memory ("CD-ROM"), digital versatile disks ("DVD"), high definition/density digital versatile/video disc ("HD-DVD"), BLU-RAY disc, or other optical storage, magnetic cassettes, magnetic tape, magnetic disk storage or other magnetic storage devices, or any other medium which can be used to store the desired information and which can be accessed by the computer architecture 800. For purposes of the claims, the phrase "computer storage medium," "computer-readable storage medium," and variations thereof, does not include communication media.

According to various configurations, the computer architecture 800 can operate in a networked environment using logical connections to remote computers through the network(s) 828. The computer architecture 800 can connect to the network 828 through a network interface unit 830 connected to the bus 810. It should be appreciated that the network interface unit 830 also can be utilized to connect to various types of networks and remote computer systems. The computer architecture 800 also can include an input/output controller 832 for receiving and processing input from an input device (e.g., an input mechanism 104) or an input interface, and to provide output to an output device or an output interface. Numerous examples of input and output devices and interfaces are described herein.

It should be appreciated that the software components described herein can, when loaded into the CPU 802 and executed, transform the CPU 802 and the overall computer architecture 800 from a general-purpose computing system into a special-purpose computing system customized to facilitate the functionality presented herein. The CPU 802 can be constructed from any number of transistors or other discrete circuit elements, which can individually or collectively assume any number of states. More specifically, the CPU 802 can operate as a finite-state machine, in response to executable instructions contained within the software modules described herein. These computer-executable instructions can transform the CPU 802 by specifying how the CPU 802 transitions between states, thereby transforming the transistors or other discrete hardware elements constituting the CPU 802. In some examples, processor(s) 206, processor(s) 220, and/or processor(s) 230 can correspond to CPU 802.

Encoding the software modules presented herein also can transform the physical structure of the computer-readable media presented herein. The specific transformation of physical structure can depend on various factors, in different implementations of this description. Examples of such factors can include, but are not limited to, the technology used to implement the computer-readable media, whether the computer-readable media is characterized as primary or secondary storage, and the like. For example, if the computer-readable media is implemented as semiconductor-based memory, the software described herein can be encoded on the computer-readable media by transforming the physical state of the semiconductor memory. For example, the software can transform the state of transistors, capacitors, or other discrete circuit elements constituting the semiconductor memory. The software also can transform the physical state of such components in order to store data thereupon.

As another example, the computer-readable media described herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations also can include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 800 in order to store and execute the software components presented herein. It also should be appreciated that the computer architecture 800 can include various types of computing entities, including hand-held computers, embedded computer systems, personal digital assistants, and other types of computing entities known to those skilled in the art.

Figure 9:
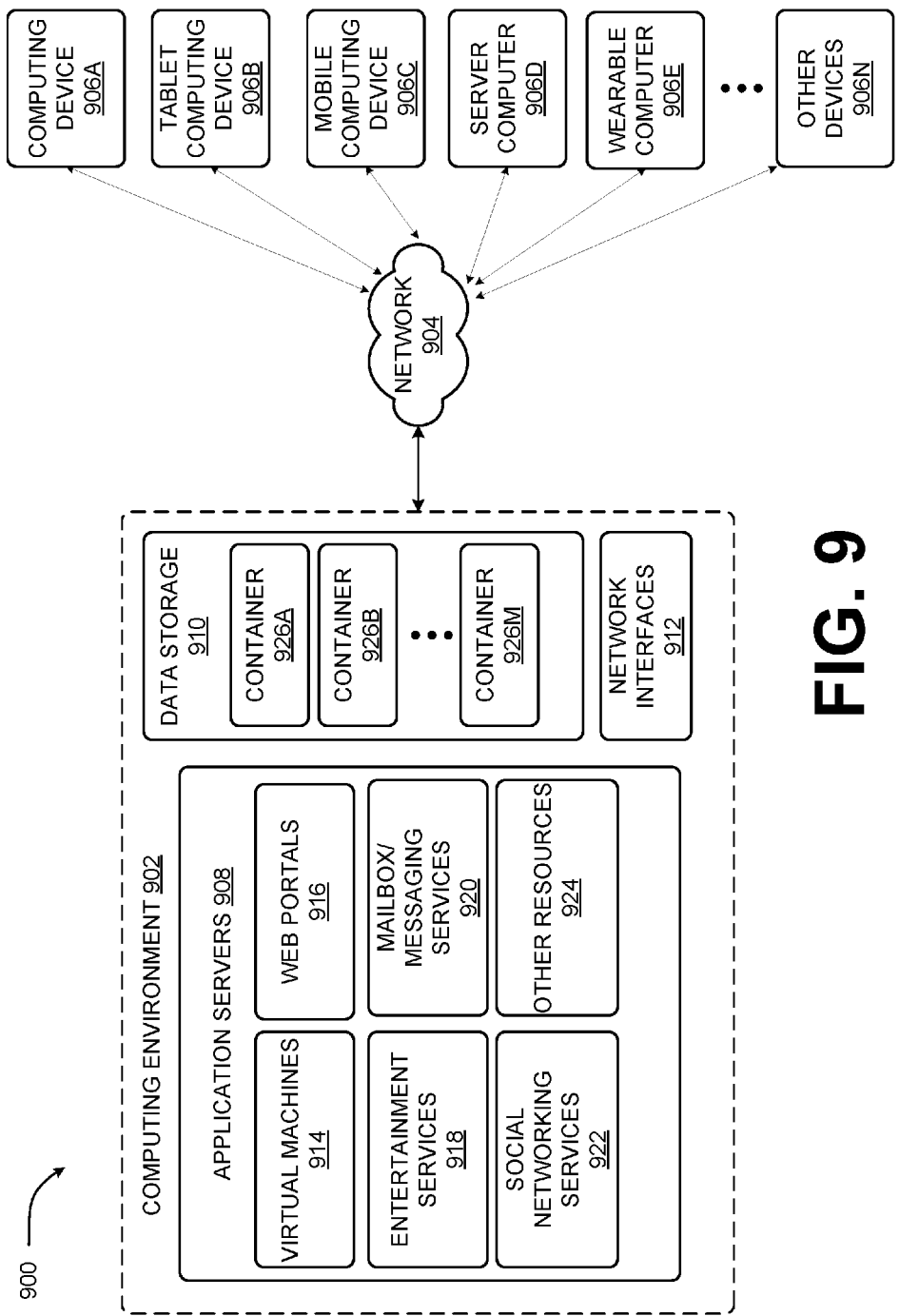
FIG. 9 shows details of an example distributed computing environment capable of executing aspects of the techniques described herein.

FIG. 9 shows details of an example distributed computing environment 900 capable of executing aspects of the techniques described herein. According to various implementations, the distributed computing environment 900 includes a computing environment 902 operating on, in communication with, or as part of a network 904. In at least one example, at least some of computing environment 902 can correspond to the head-mounted device 102, a network device, or other computing device. The network 904 can be or can include network(s) 204 and/or network(s) 828, described above with reference to FIGS. 2 and 8, respectively. The network 904 also can include various access networks. One or more client devices 906A-906N (hereinafter referred to collectively and/or generically as "clients 906") can communicate with the computing environment 902 via the network 904 and/or other connections (not illustrated in FIG. 9). N may be any integer greater than or equal to 1 depending on the desired architecture. In one illustrated configuration, the clients 906 include a computing device 906A such as a laptop computer, a desktop computer, or other computing device, a slate or tablet computing device ("tablet computing device") 906B, a mobile computing device 906C such as a mobile telephone, a smart phone, or other mobile computing device, a server computer 906D, a wearable computer 906E, and/or other devices 906N. It should be understood that any number of clients 906 can communicate with the computing environment 902. An example computing architecture for the clients 906 is illustrated and described herein with reference to FIG. 8. It should be understood that the illustrated clients 906 and computing architectures illustrated and described herein are illustrative, and should not be construed as being limited in any way.

In the illustrated configuration, the computing environment 902 includes application servers 908, data storage 910, and one or more network interfaces 912. According to various implementations, the functionality of the application servers 908 can be provided by one or more server computers that are executing as part of, or in communication with, the network 904. In some examples, the computing environment 902 can correspond to or be representative of the network devices 202 in FIG. 2, which are in communication with and accessible by the one or more computing devices (e.g., the head-mounted device 102) via the network(s) 204 and/or 904.

In at least one example, the application servers 908 can host various services, virtual machines, portals, and/or other resources. In the illustrated configuration, the application servers 908 can host one or more virtual machines 914 for executing applications or other functionality. The application servers 908 also host or provide access to one or more portals, link pages, Web sites, and/or other information ("Web portals") 916. The Web portals 916 can be used to communicate with one or more client computers. The application servers 908 can include one or more entertainment services 918. The entertainment services 918 can include various gaming experiences for one or more users.

According to various implementations, the application servers 908 also include one or more mailbox and/or messaging services 920. The mailbox and/or messaging services 920 can include electronic mail ("email") services, various personal information management ("PIM") services (e.g., calendar services, contact management services, collaboration services, etc.), instant messaging services, chat services, forum services, and/or other communication services.

The application servers 908 also can include one or more social networking services 922. The social networking services 922 can include various social networking services including, but not limited to, services for sharing or posting status updates, instant messages, links, photos, videos, and/ or other information; services for commenting or displaying interest in articles, products, blogs, or other resources; and/or other services. In some configurations, the social networking services 922 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 922 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from MICROSOFT CORPORATION in Redmond, Wash. Other services are possible and are contemplated.

The social networking services 922 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 922 are not mentioned herein for the sake of brevity. As such, the above configurations are illustrative, and should not be construed as being limited in any way. According to various implementations, the social networking services 922 can provide a source of images, video, audio, or other content to be presented or output (e.g., via a head-mounted device 102).

As shown in FIG. 9, the application servers 908 also can host other services, applications, portals, and/or other resources ("other resources") 924. The other resources 924 can deploy a service-oriented architecture or any other client-server management software. It thus can be appreciated that the computing environment 902 can provide integration of the techniques described herein with various mailbox, messaging, social networking, and/or other services or resources.

As mentioned above, the computing environment 902 can include the data storage 910. According to various implementations, the functionality of the data storage 910 is provided by one or more databases operating on, or in communication with, the network 904. The functionality of the data storage 910 also can be provided by one or more server computers configured to host data for the computing environment 902. The data storage 910 can include, host, or provide one or more real or virtual containers 926A-926M (referred to collectively and/or generically as "containers 926"). Although not illustrated in FIG. 9, the containers 926 also can host or store data structures and/or algorithms for execution by one or more modules of remote computing devices. Aspects of the containers 926 can be associated with a database program, file system and/or any program that stores data with secure access features. Aspects of the containers 926 can also be implemented using products or services, such as ACTIVE DIRECTORY, DKM, ONE-DRIVE, DROPBOX or GOOGLEDRIVE.

The computing environment 902 can communicate with, or be accessed by, the network interfaces 912. The network interfaces 912 can include various types of network hardware and software for supporting communications between two or more computing entities including, but not limited to, the clients 906 and the application servers 908. It should be appreciated that the network interfaces 912 also can be utilized to connect to other types of networks and/or computer systems.

It should be understood that the distributed computing environment 900 described herein can provide any aspects of the software elements described herein with any number of virtual computing resources and/or other distributed computing functionality that can be configured to execute any aspects of the software components described herein. According to various implementations of the concepts and technologies described herein, the distributed computing environment 900 provides the software functionality described herein as a service to the clients 906. It should be understood that the clients 906 can include real or virtual machines including, but not limited to, server computers, web servers, personal computers, tablet computers, gaming consoles, smart televisions, mobile computing entities, smart phones, wearable computers (e.g., the head-mounted device 102), and/or other devices.

Figure 10:
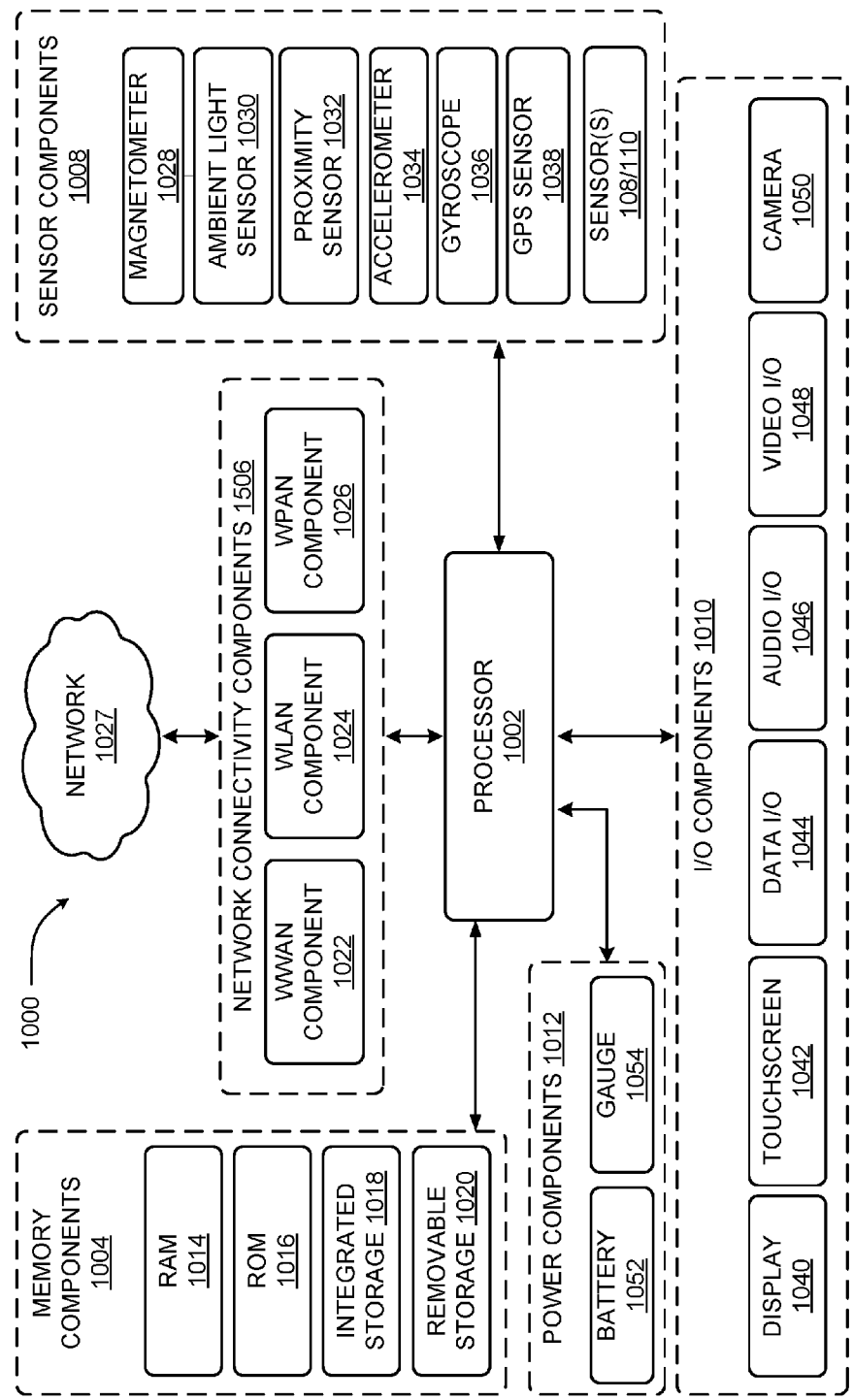
FIG. 10 shows details of another example computing device architecture for a computing device, such as a head-mounted device, capable of executing aspects of the techniques described herein.

FIG. 10 shows details of another example computing device architecture 1000 for a computing device, such as a head-mounted device 102, capable of executing aspects of the techniques described herein. The computing device architecture 1000 is applicable to computing entities that facilitate mobile computing due, in part, to form factor, wireless connectivity, and/or battery-powered operation. In some configurations, the computing entities include, but are not limited to, mobile telephones, tablet devices, slate devices, wearable devices (e.g., the head-mounted device 102), portable video game devices, and the like. Moreover, aspects of the computing device architecture 1000 can be applicable to traditional desktop computers, portable computers (e.g., laptops, notebooks, ultra-portables, and netbooks), server computers, vehicle computers, and other computer systems.

The computing device architecture 1000 illustrated in FIG. 10 includes a processor 1002, memory components 1004, network connectivity components 1006, sensor components 1008, input/output components 1010, and power components 1012. In the illustrated configuration, the processor 1002 is in communication with the memory components 1004, the network connectivity components 1006, the sensor components 1008, the input/output ("I/O") components 1010, and the power components 1012. Although no connections are shown between the individual components illustrated in FIG. 10, the components can interact to carry out device functions. In some configurations, the components are arranged so as to communicate via one or more busses (not shown).

The processor 1002 includes a central processing unit ("CPU") configured to process data, execute computer-executable instructions of one or more applications, and communicate with other components of the computing device architecture 1000 in order to perform various functionality described herein. The processor 1002 can be utilized to execute aspects of the software components presented herein.

In some configurations, the processor 1002 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 1080i, 1080p, and higher resolution), video games, three-dimensional ("3D") modeling applications, and the like. In some configurations, the processor 1002 is configured to communicate with a discrete GPU (not shown). In some examples, the processor 1002 may additionally or alternatively comprise a holographic processing unit (HPU) which is designed specifically to process and integrate data from multiple sensors of a head-mounted computing device and to handle tasks such as spatial correlation (e.g., spatial mapping), gesture recognition, and voice and speech recognition. In any case, the CPU, GPU, and/or HPU can be configured in accordance with a co-processing CPU/GPU/HPU computing model, wherein processing tasks are divided between the CPU, GPU, and/or HPU according to their respective strengths. For instance, the sequential part of an application may execute on the CPU, the computationally-intensive part is accelerated by the GPU, and certain specialized functions (e.g., spatial mapping, gesture recognition, and voice and speech recognition) may executed by an HPU.

In some configurations, the processor 1002 is, or is included in, a System-on-Chip ("SoC") along with one or more of the other components described herein below. For example, the SoC can include the processor 1002, a GPU, one or more of the network connectivity components 1006, and one or more of the sensor components 1008. In some configurations, the processor 1002 is fabricated, in part, utilizing a Package-on-Package ("PoP") integrated circuit packaging technique. The processor 1002 can be a single core or multi-core processor.

The processor 1002 can be created in accordance with an ARM architecture, available for license from ARM HOLDINGS of Cambridge, United Kingdom. Alternatively, the processor 1002 can be created in accordance with an x86 architecture, such as is available from INTEL CORPORATION of Mountain View, Calif. and others. In some configurations, the processor 1002 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1004 include a random access memory ("RAM") 1014, a read-only memory ("ROM") 1016, an integrated storage memory ("integrated storage") 1018, and a removable storage memory ("removable storage") 1020. In some configurations, the RAM 1014 or a portion thereof, the ROM 1016 or a portion thereof, and/or some combination the RAM 1014 and the ROM 1016 is integrated in the processor 1002. In some configurations, the ROM 1016 is configured to store a firmware, an operating system or a portion thereof (e.g., operating system kernel), and/or a bootloader to load an operating system kernel from the integrated storage 1018 and/or the removable storage 1020.

The integrated storage 1018 can include a solid-state memory, a hard disk, or a combination of solid-state memory and a hard disk. The integrated storage 1018 can be soldered or otherwise connected to a logic board upon which the processor 1002 and other components described herein also can be connected. As such, the integrated storage 1018 is integrated in the computing device. The integrated storage 1018 is configured to store an operating system or portions thereof, application programs, data, and other software components described herein.

The removable storage 1020 can include a solid-state memory, a hard disk, or a combination of solid-state memory and a hard disk. In some configurations, the removable storage 1020 is provided in lieu of the integrated storage 1018. In other configurations, the removable storage 1020 is provided as additional optional storage. In some configurations, the removable storage 1020 is logically combined with the integrated storage 1018 such that the total available storage is made available as a total combined storage capacity. In some configurations, the total combined capacity of the integrated storage 1018 and the removable storage 1020 is shown to a user instead of separate storage capacities for the integrated storage 1018 and the removable storage 1020.

The removable storage 1020 is configured to be inserted into a removable storage memory slot (not shown) or other mechanism by which the removable storage 1020 is inserted and secured to facilitate a connection over which the removable storage 1020 can communicate with other components of the computing device, such as the processor 1002. The removable storage 1020 can be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1004 can store an operating system. According to various configurations, the operating system includes, but is not limited to, SYMBIAN OS from SYMBIAN LIMITED, WINDOWS MOBILE OS from MICROSOFT CORPORATION of Redmond, Wash., WINDOWS PHONE OS from MICROSOFT CORPORATION, WINDOWS from MICROSOFT CORPORATION, PALM WEBOS from HEWLETT-PACKARD COMPANY of Palo Alto, Calif., BLACKBERRY OS from RESEARCH IN MOTION LIMITED of Waterloo, Ontario, Canada, IOS from APPLE INC. of Cupertino, Calif., and ANDROID OS from GOOGLE INC. of Mountain View, Calif. Other operating systems are also contemplated.

The network connectivity components 1006 include a wireless wide area network component ("WWAN component") 1022, a wireless local area network component ("WLAN component") 1024, and a wireless personal area network component ("WPAN component") 1026. The network connectivity components 1006 facilitate communications to and from the network 1027 or another network, which can be a WWAN, a WLAN, or a WPAN. Although only the network 1027 is illustrated, the network connectivity components 1006 can facilitate simultaneous communication with multiple networks, including the network 1027 of FIG. 10. For example, the network connectivity components 1006 can facilitate simultaneous communications with multiple networks via one or more of a WWAN, a WLAN, or a WPAN. In some examples, the network 1027 can correspond to all or part of network(s) 204, network 828, and/or network 904.

The network 1027 can be or can include a WWAN, such as a mobile telecommunications network utilizing one or more mobile telecommunications technologies to provide voice and/or data services to a computing device utilizing the computing device architecture 1000 via the WWAN component 1022. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 1027 can utilize various channel access methods (which can or cannot be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 1027 can be configured to provide voice and/or data communications with any combination of the above technologies. The network 1027 can be configured to or adapted to provide voice and/or data communications in accordance with future generation technologies.

In some configurations, the WWAN component 1022 is configured to provide dual-multi-mode connectivity to the network 1027. For example, the WWAN component 1022 can be configured to provide connectivity to the network 1027, wherein the network 1027 provides service via GSM and UMTS technologies, or via some other combination of technologies. Alternatively, multiple WWAN components 1022 can be utilized to perform such functionality, and/or provide additional functionality to support other non-compatible technologies (i.e., incapable of being supported by a single WWAN component). The WWAN component 1022 can facilitate similar connectivity to multiple networks (e.g., a UMTS network and an LTE network).

The network 1027 can be a WLAN operating in accordance with one or more Institute of Electrical and Electronic Engineers ("IEEE") 802.15 standards, such as IEEE 802.15a, 802.15b, 802.15g, 802.15n, and/or future 802.15 standard (referred to herein collectively as Wi-Fi). Draft 802.15 standards are also contemplated. In some configurations, the WLAN is implemented utilizing one or more wireless Wi-Fi access points. In some configurations, one or more of the wireless Wi-Fi access points are another computing device with connectivity to a WWAN that are functioning as a Wi-Fi hotspot. The WLAN component 1024 is configured to connect to the network 1027 via the Wi-Fi access points. Such connections can be secured via various encryption technologies including, but not limited, Wi-Fi Protected Access ("WPA"), WPA2, Wired Equivalent Privacy ("WEP"), and the like.

The network 1027 can be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 1026 is configured to facilitate communications with other devices, such as peripherals, computers, or other computing entities via the WPAN.

In at least one example, the sensor components 1008 can include a magnetometer 1028, an ambient light sensor 1030, a proximity sensor 1032, an accelerometer 1034, a gyroscope 1036, and a Global Positioning System sensor ("GPS sensor") 1038. Additionally, the sensor components 1008 can include any or all of the sensor(s) 210 and/or 228 as described above with reference to FIGS. 1 and 2. It is contemplated that other sensors, such as, but not limited to, temperature sensors or shock detection sensors, strain sensors, moisture sensors also can be incorporated in the computing device architecture 1000.

The magnetometer 1028 is configured to measure the strength and direction of a magnetic field. In some configurations the magnetometer 1028 provides measurements to a compass application program stored within one of the memory components 1004 in order to provide a user with accurate directions in a frame of reference including the cardinal directions, north, south, east, and west. Similar measurements can be provided to a navigation application program that includes a compass component. Other uses of measurements obtained by the magnetometer 1028 are contemplated.

The ambient light sensor 1030 is configured to measure ambient light. In some configurations, the ambient light sensor 1030 provides measurements to an application program stored within one the memory components 1004 in order to automatically adjust the brightness of a display to compensate for low-light and high-light environments. Other uses of measurements obtained by the ambient light sensor 1030 are contemplated.

The proximity sensor 1032 is configured to detect the presence of an object or thing in proximity to the computing device without direct contact. In some configurations, the proximity sensor 1032 detects the presence of a user's body (e.g., the user's face) and provides this information to an application program stored within one of the memory components 1004 that utilizes the proximity information to enable or disable some functionality of the computing device. Other uses of proximity as detected by the proximity sensor 1028 are contemplated.

The accelerometer 1034 is configured to measure proper acceleration. In some configurations, output from the accelerometer 1034 is used by an application program as an input mechanism to control some functionality of the application program. For example, the application program can be a video game in which a character, a portion thereof, or an object is moved or otherwise manipulated in response to input received via the accelerometer 1034. In some configurations, output from the accelerometer 1034 is provided to an application program for use in switching between landscape and portrait modes, calculating coordinate acceleration, or detecting a fall. Other uses of the accelerometer 1034 are contemplated.

The gyroscope 1036 is configured to measure and maintain orientation. In some configurations, output from the gyroscope 1036 is used by an application program as an input mechanism to control some functionality of the application program. For example, the gyroscope 1036 can be used for accurate recognition of movement within a 3D environment of a video game application or some other application. In some configurations, an application program utilizes output from the gyroscope 1036 and the accelerometer 1034 to enhance control of some functionality of the application program. Other uses of the gyroscope 1036 are contemplated.

The GPS sensor 1038, or other position sensing techniques, is configured to receive signals from GPS satellites for use in calculating a location. The location calculated by the GPS sensor 1038 can be used by any application program that requires or benefits from location information. For example, the location calculated by the GPS sensor 1038 can be used with a navigation application program to provide directions from the location to a destination or directions from the destination to the location. Moreover, the GPS sensor 1038 can be used to provide location information to an external location-based service, such as E1515 service. The GPS sensor 1038 can obtain location information generated via WI-FI, WIMAX, and/or cellular triangulation techniques utilizing one or more of the network connectivity components 1006 to aid the GPS sensor 1038 in obtaining a location fix. The GPS sensor 1038 can also be used in Assisted GPS ("A-GPS") systems.

In at least one example, the I/O components 1010 can correspond to input interface(s) and/or output interface(s). The I/O components can include a display 1040, a touchscreen 1042, a data I/O interface component ("data I/O") 1044, an audio I/O interface component ("audio I/O") 15046, a video I/O interface component ("video I/O") 1048, and a camera 1050. In some configurations, the display 1040 and the touchscreen 1042 are combined. In some configurations two or more of the data I/O component 1044, the audio I/O component 1046, and the video I/O component 1048 are combined. The I/O components 1010 can include discrete processors configured to support the various interface described below, or can include processing functionality built-in to the processor 1002.

The display 1040 is an output device configured to present information in a visual form. In particular, the display 1040 can present graphical user interface ("GUI") elements, text, photographs, images, video, notifications, virtual buttons, virtual keyboards, messaging data, Internet content, device status, time, date, calendar data, preferences, map information, location information, and any other information that is capable of being presented in a visual form. In some configurations, the display 1040 is a liquid crystal display ("LCD") utilizing any active or passive matrix technology and any backlighting technology (if used). In some configurations, the display 1040 is an organic light emitting diode ("OLED") display. In some configurations, the display 1040 is a holographic display. Other display types are contemplated.

In at least one example, the display 1040 can correspond to the hardware display surface described above which can be configured to graphically associate holographic user interfaces and other graphical elements with an object seen through the hardware display surface or rendered objects displayed on the hardware display surface.

The touchscreen 1042, also referred to herein as a "touch-enabled screen," is an input device configured to detect the presence and location of a touch. The touchscreen 1042 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen 1042 is incorporated on top of the display 1040 as a transparent layer to enable a user to use one or more touches to interact with objects or other information presented on the display 1040. In other configurations, the touchscreen 1042 is a touch pad incorporated on a surface of the computing device that does not include the display 1040. For example, the computing device can have a touchscreen incorporated on top of the display 1040 and a touch pad on a surface opposite the display 1040.

In some configurations, the touchscreen 1042 is a single-touch touchscreen. In other configurations, the touchscreen 1042 is a multi-touch touchscreen. In some configurations, the touchscreen 1042 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 1042. As such, a developer can create gestures that are specific to a particular application program.

In some configurations, the touchscreen 1042 supports a tap gesture in which a user taps the touchscreen 1042 once on an item presented on the display 1040. The tap gesture can be used to perform various functions including, but not limited to, opening or launching whatever the user taps. In some configurations, the touchscreen 1042 supports a double tap gesture in which a user taps the touchscreen 1042 twice on an item presented on the display 1040. The double tap gesture can be used to perform various functions including, but not limited to, zooming in or zooming out in stages. In some configurations, the touchscreen 1042 supports a tap and hold gesture in which a user taps the touchscreen 1042 and maintains contact for at least a pre-defined time. The tap and hold gesture can be used to perform various functions including, but not limited to, opening a context-specific menu.

In some configurations, the touchscreen 1042 supports a pan gesture in which a user places a finger on the touchscreen 1042 and maintains contact with the touchscreen 1042 while moving the finger on the touchscreen 1042. The pan gesture can be used to perform various functions including, but not limited to, moving through screens, images, or menus at a controlled rate. Multiple finger pan gestures are also contemplated. In some configurations, the touchscreen 1042 supports a flick gesture in which a user swipes a finger in the direction the user wants the screen to move. The flick gesture can be used to perform various functions including, but not limited to, scrolling horizontally or vertically through menus or pages. In some configurations, the touchscreen 1042 supports a pinch and stretch gesture in which a user makes a pinching motion with two fingers (e.g., thumb and forefinger) on the touchscreen 1042 or moves the two fingers apart. The pinch and stretch gesture can be used to perform various functions including, but not limited to, zooming gradually in or out of a website, map, or picture.

Although the above gestures have been described with reference to the use of one or more fingers for performing the gestures, other appendages such as toes or objects such as styluses can be used to interact with the touchscreen 1042. As such, the above gestures should be understood as being illustrative and should not be construed as being limited in any way.

The data I/O interface component 1044 is configured to facilitate input of data to the computing device and output of data from the computing device. In some configurations, the data I/O interface component 1044 includes a connector configured to provide wired connectivity between the computing device and a computer system, for example, for synchronization operation purposes. The connector can be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 1046 is configured to provide audio input and/or output capabilities to the computing device. In some configurations, the audio I/O interface component 1046 includes a microphone configured to collect audio signals. In some configurations, the audio I/O interface component 1046 includes a headphone jack configured to provide connectivity for headphones or other external speakers. In some configurations, the audio I/O interface component 1046 includes a speaker for the output of audio signals. In some configurations, the audio I/O interface component 1046 includes an optical audio cable out.

The video I/O interface component 1048 is configured to provide video input and/or output capabilities to the computing device. In some configurations, the video I/O interface component 1048 includes a video connector configured to receive video as input from another device (e.g., a video media player such as a DVD or BLURAY player) or send video as output to another device (e.g., a monitor, a television, or some other external display). In some configurations, the video I/O interface component 1048 includes a High-Definition Multimedia Interface ("HDMI"), mini-HDMI, micro-HDMI, DisplayPort, or proprietary connector to input/output video content. In some configurations, the video I/O interface component 1048 or portions thereof is combined with the audio I/O interface component 1046 or portions thereof.

The camera 1050 can be configured to capture still images and/or video. The camera 1050 can utilize a charge coupled device ("CCD") or a complementary metal oxide semiconductor ("CMOS") image sensor to capture images. In some configurations, the camera 1050 includes a flash to aid in taking pictures in low-light environments. Settings for the camera 1050 can be implemented as hardware or software buttons. Images and/or video captured by camera 1050 may additionally or alternatively be used to detect non-touch gestures, facial expressions, eye movement, or other movements and/or characteristics of the user.

Although not illustrated, one or more hardware buttons can also be included in the computing device architecture 1000. The hardware buttons can be used for controlling some operational aspect of the computing device. The hardware buttons can be dedicated buttons or multi-use buttons. The hardware buttons can be mechanical or sensor-based.

The illustrated power components 1012 include one or more batteries 1052, which can be connected to a battery gauge 1054. The batteries 1052 can be rechargeable or disposable. Rechargeable battery types include, but are not limited to, lithium polymer, lithium ion, nickel cadmium, and nickel metal hydride. Each of the batteries 1052 can be made of one or more cells.

The battery gauge 1054 can be configured to measure battery parameters such as current, voltage, and temperature. In some configurations, the battery gauge 1054 is configured to measure the effect of a battery's discharge rate, temperature, age and other factors to predict remaining life within a certain percentage of error. In some configurations, the battery gauge 1054 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 1012 can also include a power connector, which can be combined with one or more of the aforementioned I/O components 1010. The power components 1012 can interface with an external power system or charging equipment via a power I/O component.

EXAMPLE CLAUSES

Example clause A, a device comprising: a display configured to present virtual content; an interface communicatively coupled to an input mechanism that is configured to collect data associated with motion of the input mechanism; one or more processors communicatively coupled to the display; and memory having computer-executable instructions stored thereon which, when executed by the one or more processors, cause the device to perform operations comprising: identifying a target object in a scene based at least on one of a detected direction of eye gaze of a user or a detected position or orientation of the input mechanism; determining a distance between the target object and the device; mapping the distance to a value in a smoothing scale; and using the value in the smoothing scale to adjust a parameter of a smoothing algorithm, the smoothing algorithm controlling motion of a virtual element presented by the display relative to the motion of the input mechanism.

Example clause B, the device of Example clause A, wherein the: the smoothing scale increases an amount of smoothing as the distance between the target object and the device increases; and the smoothing scale decreases the amount of smoothing as the distance between the target object and the device decreases.

Example clause C, the device of Example clause A or Example clause B, wherein: the motion of the input mechanism occurs within a first three-dimensional coordinate space; the motion of the virtual element occurs within a second three-dimensional coordinate space that is larger than the first three-dimensional coordinate space; and the operations further comprise converting, using the smoothing algorithm, the motion of the input mechanism that occurs within the first three-dimensional coordinate space into the motion of the virtual element that occurs within the second three-dimensional coordinate space.

Example clause D, the device of Example clause C, wherein: the first three-dimensional coordinate space is associated with three-dimensional space within which the input mechanism can be moved; and the second three-dimensional coordinate space is associated with three-dimensional space within a view of the user.

Example clause E, the device of Example clause D, wherein the display comprises a transparent display that presents the virtual content in association with real-world content within the view of the user.

Example clause F, the device of Example clause D or Example clause E, wherein the object comprises one of a virtual object presented on the display or a real-world object within the view of the user.

Example clause G, the device of any one of Example clauses A through F, wherein the virtual element comprises at least one of a cursor element or a pointer element.

Example clause H, the device of any one of Example clauses A through G, wherein the smoothing algorithm comprises an exponential smoothing filter and the value corresponds to a half-life value.

While Example clauses A through H are provided above with respect to a device, it is understood in the context of this document that the subject matter of Example clauses A through H can be implemented via a system, a method, and/or via instructions stored on computer readable storage media.

Example clause I, a device comprising: a display configured to present virtual content; an interface communicatively coupled to an input mechanism that is configured to collect data associated with rotation of the input mechanism; one or more processors communicatively coupled to the display; and memory having computer-executable instructions stored thereon which, when executed by the one or more processors, cause the device to perform operations comprising: identifying a target object in a scene based at least on one of a detected direction of eye gaze of a user or a detected position or orientation of the input mechanism; determining a distance between the target object and the device; mapping the distance to a value in a smoothing scale; and using the value in the smoothing scale to adjust a parameter of a smoothing algorithm, the smoothing algorithm controlling rotation of a virtual element presented by the display relative to the rotation of the input mechanism.

Example clause J, the device of Example clause I, wherein: the smoothing scale increases an amount of smoothing as the distance between the target object and the device increases; and the smoothing scale decreases the amount of smoothing as the distance between the target object and the device decreases.

Example clause K, the device of Example clause I or Example clause J, wherein: the rotation of the input mechanism occurs within a first three-dimensional coordinate space; the rotation of the virtual element occurs within a second three-dimensional coordinate space that is larger than the first three-dimensional coordinate space; and the operations further comprise converting, using the smoothing algorithm, the rotation of the input mechanism that occurs within the first three-dimensional coordinate space into the rotation of the virtual element that occurs within the second three-dimensional coordinate space.

Example clause L, the device of Example clause K, wherein: the first three-dimensional coordinate space is associated with three-dimensional space within which the input mechanism can be moved; and the second three-dimensional coordinate space is associated with three-dimensional space within a view of the user.

Example clause M, the device of Example clause L, wherein the display comprises a transparent display that presents the virtual content in association with real-world content within the view of the user.

Example clause N, the device of Example clause L or Example clause M, wherein the object comprises one of a virtual object presented on the display or a real-world object within the view of the user.

Example clause O, the device of any one of Example clauses I through N, wherein the virtual element comprises at least one of a cursor element or a pointer element.

Example clause P, the device of any one of Example clauses I through O, wherein the smoothing algorithm comprises an exponential smoothing filter and the value corresponds to a half-life value.

While Example clauses I through P are provided above with respect to a device, it is understood in the context of this document that the subject matter of Example clauses I through P can be implemented via a system, a method, and/or via instructions stored on computer readable storage media.

Example clause Q, a device comprising: one or more processors; and memory having computer-executable instructions stored thereon which, when executed by the one or more processors, cause the device to perform operations comprising: mapping a distance between a target object and the device to a value in a smoothing scale; collecting data associated with at least one of motion or rotation of the device; and using the value in the smoothing scale to adjust a parameter of a smoothing algorithm, the smoothing algorithm controlling a structure that enables at least one of motion or rotation of a corresponding output relative to the at least one of the motion or the rotation of the device.

Example clause R, the device of Example clause Q, wherein the distance is received from another device configured within an environment to determine a location of the target object, to determine a location of the device, and to calculate the distance based at least in part on the location of the target object and the location of the device.

Example clause S, the device of Example clause Q or Example clause R, wherein: the smoothing scale increases an amount of smoothing as the distance between the target object and the device increases; and the smoothing scale decreases the amount of smoothing as the distance between the target object and the device decreases.

Example clause T, the device of any one of Example clauses Q through S, wherein the corresponding output comprises a beam of light directed at the target object.

While Example clauses Q through T are provided above with respect to a device, it is understood in the context of this document that the subject matter of Example clauses Q through T can be implemented via a system, a method, and/or via instructions stored on computer readable storage media.

Example clause U, a device comprising: means for displaying virtual content; means for identifying a target object in a scene based at least in part on a sensed direction of eye gaze of a user; means for determining a distance between the target object and the device; means for mapping the distance to a value in a smoothing scale; means for collecting data associated with motion of an input mechanism; and means for using the value in the smoothing scale to adjust a parameter of a smoothing algorithm, the smoothing algorithm controlling motion of a virtual element presented by the display relative to the motion of the input mechanism.

Example clause V, a device comprising: means for displaying virtual content; means for identifying a target object in a scene based in part on at least one of the data points associated with the rotation of the input mechanism or a sensed direction of eye gaze of a user; means for determining a distance between the target object and the device; means for mapping the distance to a value in a smoothing scale; means for collecting data associated with rotation of an input mechanism; and means for using the value in the smoothing scale to adjust a parameter of a smoothing algorithm, the smoothing algorithm controlling rotation of a virtual element presented by the display relative to the rotation of the input mechanism.

Example clause W, a device comprising: means for mapping a distance between a target object and the device to a value in a smoothing scale; means for collecting data associated with at least one of motion or rotation of the device; and means for using the value in the smoothing scale to adjust a parameter of a smoothing algorithm; and means for controlling, based at least in part on the smoothing algorithm, a structure that enables at least one of motion or rotation of a corresponding output relative to the at least one of the motion or the rotation of the device.

Although the subject matter has been described in language specific to structural features and/or methodological acts, it is to be understood that the subject matter defined in the appended claims is not necessarily limited to the specific features or acts described. Rather, the specific features and acts are described as illustrative forms of implementing the claims.

Conditional language such as, among others, "can," "could," "might" or "can," unless specifically stated otherwise, are understood within the context to present that certain examples include, while other examples do not necessarily include, certain features, elements and/or steps. Thus, such conditional language is not generally intended to imply that certain features, elements and/or steps are in any way required for one or more examples or that one or more examples necessarily include logic for deciding, with or without input or prompting, whether certain features, elements and/or steps are included or are to be performed in any particular example. Conjunctive language such as the phrase "at least one of X, Y or Z," unless specifically stated otherwise, is to be understood to present that an item, term, etc. can be either X, Y, or Z, or a combination thereof.

What is claimed is:

1. A device comprising:
   a display configured to present virtual content;
   an interface communicatively coupled to an input device configured with one or more sensors to collect data associated with motion of the input device;
   one or more processors communicatively coupled to the display; and
   memory having computer-executable instructions stored thereon which, when executed by the one or more processors, cause the device to perform operations comprising:
      identifying a target object in a scene based at least on one of a direction of eye gaze of a user or a detected position or orientation of the input device, wherein the target object comprises one of a virtual object presented on the display or a real-world object within a view of the user;
      determining a distance between a location of the target object and a location of the device;
      mapping the distance to a stored value in a smoothing scale; and
      using the stored value in the smoothing scale to adjust a parameter of a smoothing algorithm, the smoothing algorithm controlling motion of a virtual element presented by the display relative to the motion of the input device.

2. The device of claim 1, wherein:
   the smoothing scale increases an amount of smoothing as the distance between the location of the target object and the location of the device increases; and
   the smoothing scale decreases the amount of smoothing as the distance between the location of the target object and the location of the device decreases.

3. The device of claim 1, wherein:
   the motion of the input device occurs within a first three-dimensional coordinate space;
   the motion of the virtual element occurs within a second three-dimensional coordinate space that is larger than the first three-dimensional coordinate space; and
   the operations further comprise converting, using the smoothing algorithm, the motion of the input device that occurs within the first three-dimensional coordinate space into the motion of the virtual element that occurs within the second three-dimensional coordinate space.

4. The device of claim 3, wherein:
the first three-dimensional coordinate space is associated with three-dimensional space within which the input device can be moved; and
the second three-dimensional coordinate space is associated with three-dimensional space within the view of the user.

5. The device of claim 4, wherein the display comprises a transparent display that presents the virtual content in association with real-world content within the view of the user.

6. The device of claim 1, wherein the virtual element comprises at least one of a cursor element or a pointer element.

7. The device of claim 1, wherein the smoothing algorithm comprises an exponential smoothing filter and the stored value corresponds to a half-life value.

8. A device comprising:
a display configured to present virtual content;
an interface communicatively coupled to an input device configured with one or more sensors to collect data associated with rotation of the input device;
one or more processors communicatively coupled to the display; and
memory having computer-executable instructions stored thereon which, when executed by the one or more processors, cause the device to perform operations comprising:
identifying a target object in a scene based at least on one of a direction of eye gaze of a user or a detected position or orientation of the input device, wherein the target object comprises one of a virtual object presented on the display or a real-world object within a view of the user;
determining a distance between a location of the target object and a location of the device;
mapping the distance to a stored value in a smoothing scale; and
using the stored value in the smoothing scale to adjust a parameter of a smoothing algorithm, the smoothing algorithm controlling rotation of a virtual element presented by the display relative to the rotation of the input device.

9. The device of claim 8, wherein:
the smoothing scale increases an amount of smoothing as the distance between the location of the target object and the location of the device increases; and
the smoothing scale decreases the amount of smoothing as the distance between the location of the target object and the location of the device decreases.

10. The device of claim 8, wherein:
the rotation of the input device occurs within a first three-dimensional coordinate space;
the rotation of the virtual element occurs within a second three-dimensional coordinate space that is larger than the first three-dimensional coordinate space; and
the operations further comprise converting, using the smoothing algorithm, the rotation of the input device that occurs within the first three-dimensional coordinate space into the rotation of the virtual element that occurs within the second three-dimensional coordinate space.

11. The device of claim 10, wherein:
the first three-dimensional coordinate space is associated with three-dimensional space within which the input device can be moved; and
the second three-dimensional coordinate space is associated with three-dimensional space within the view of the user.

12. The device of claim 11, wherein the display comprises a transparent display that presents the virtual content in association with real-world content within the view of the user.

13. The device of claim 8, wherein the virtual element comprises at least one of a cursor element or a pointer element.

14. The device of claim 8, wherein the smoothing algorithm comprises an exponential smoothing filter and the value corresponds to a half-life value.

15. A device comprising:
one or more processors; and
memory having computer-executable instructions stored thereon which, when executed by the one or more processors, cause the device to perform operations comprising:
mapping a distance between a location of a target object and a location of the device to a stored value in a smoothing scale, wherein the target object comprises one of a virtual object presented on a display or a real-world object within a view of a user;
collecting data associated with at least one of motion or rotation of the device; and
using the stored value in the smoothing scale to adjust a parameter of a smoothing algorithm, the smoothing algorithm controlling a structure that enables at least one of motion or rotation of a corresponding output relative to the at least one of the motion or the rotation of the device.

16. The device of claim 15, wherein the distance is received from another device configured within an environment to determine the location of the target object, to determine the location of the device, and to calculate the distance based at least in part on the location of the target object and the location of the device.

17. The device of claim 15, wherein:
the smoothing scale increases an amount of smoothing as the distance between the location of the target object and the location of the device increases; and
the smoothing scale decreases the amount of smoothing as the distance between the location of the target object and the location of the device decreases.

18. The device of claim 15, wherein the corresponding output comprises a beam of light directed at the target object.

* * * * *